United States Patent
Kim et al.

(10) Patent No.: US 11,487,473 B2
(45) Date of Patent: Nov. 1, 2022

(54) MEMORY SYSTEM

(71) Applicant: SK hynix Inc., Icheon (KR)

(72) Inventors: Chang Hyun Kim, Seongnam (KR); Eui Cheol Lim, Icheon (KR); Young Jung Choi, Eumseong-gun (KR); Hyung Sik Won, Cheongju (KR); Sun Woong Kim, Hwaseong (KR)

(73) Assignee: SK hynix Inc., Icheon (KR)

( * ) Notice: Subject to any disclaimer, the term of this patent is extended or adjusted under 35 U.S.C. 154(b) by 64 days.

(21) Appl. No.: 17/134,117

(22) Filed: Dec. 24, 2020

(65) Prior Publication Data

US 2021/0117131 A1   Apr. 22, 2021

Related U.S. Application Data

(63) Continuation of application No. 16/858,414, filed on Apr. 24, 2020, now Pat. No. 11,288,012, and a
(Continued)

(30) Foreign Application Priority Data

Jul. 23, 2018 (KR) .......................... 10-2018-0085506
Nov. 5, 2018 (KR) .......................... 10-2018-0134170
(Continued)

(51) Int. Cl.
*G06F 3/06* (2006.01)
*G06F 13/40* (2006.01)

(52) U.S. Cl.
CPC .......... *G06F 3/0659* (2013.01); *G06F 3/0604* (2013.01); *G06F 3/0673* (2013.01); *G06F 13/4027* (2013.01)

(58) Field of Classification Search
CPC .................................................. G06F 12/0246
See application file for complete search history.

(56) References Cited

U.S. PATENT DOCUMENTS

| | | |
|---|---|---|
| 5,757,795 A | 5/1998 | Schnell |
| 7,899,052 B1 | 3/2011 | Hao et al. |

(Continued)

FOREIGN PATENT DOCUMENTS

| | | | |
|---|---|---|---|
| EP | 0464848 A2 * | 1/1992 | ............ G06F 13/28 |
| EP | 0464848 A2 | 1/1992 | |

OTHER PUBLICATIONS

Notice of Allowance for U.S. Appl. No. 16/367,700, dated Aug. 5, 2020.

(Continued)

*Primary Examiner* — Henry Tsai
*Assistant Examiner* — Juanito C Borromeo

(57) ABSTRACT

A memory system is disclosed, which relates to technology for implementing data communication between memory devices. The memory system includes a plurality of memory devices and a memory controller. The memory devices allow a data packet composed of data and header information to be directly communicated between the memory devices. The memory controller transmits the data packet to a source memory device from among the plurality of memory devices, and receives the data packet from a last memory device from among the plurality of memory devices. Each of the memory devices hashes the header information such that the data is accessed, using a result of the hash, in address regions located at different positions.

18 Claims, 26 Drawing Sheets

Related U.S. Application Data continuation-in-part of application No. 16/367,700, filed on Mar. 28, 2019, now Pat. No. 10,915,470, and a continuation-in-part of application No. 16/287,990, filed on Feb. 27, 2019, now Pat. No. 10,909,052, and a continuation-in-part of application No. 16/282,166, filed on Feb. 21, 2019, now Pat. No. 11,055,239.

(30) Foreign Application Priority Data

Nov. 21, 2018 (KR) ........................ 10-2018-0144289
Dec. 6, 2018 (KR) ........................ 10-2018-0155681

(56) References Cited

U.S. PATENT DOCUMENTS

| | | |
|---|---|---|
| 8,099,605 B1 | 1/2012 | Billsrom et al. |
| 9,619,270 B2 * | 4/2017 | Ramasubramanian ........................ G06F 9/45558 |
| 9,952,925 B2 | 4/2018 | Lea et al. |
| 9,983,821 B2 | 5/2018 | Sala et al. |
| 2013/0265883 A1 | 10/2013 | Henry et al. |
| 2014/0115579 A1 | 4/2014 | Kong |
| 2014/0208022 A1 | 7/2014 | Gordon |
| 2017/0358327 A1 | 12/2017 | Oh et al. |
| 2020/0026469 A1 * | 1/2020 | Gao ........................ G06F 3/061 |

OTHER PUBLICATIONS

Non-Final Office Action for related U.S. Appl. No. 16/858,414, dated Jun. 30, 2021.

* cited by examiner

MEMORY SYSTEM

CROSS-REFERENCE TO RELATED APPLICATION

The present application is a continuation of U.S. application Ser. No. 16/858,414, filed on Apr. 24, 2020, which is a continuation-in-part of U.S. application Ser. No. 16/282, 166, filed on Feb. 21, 2019, a continuation-in-part of U.S. application Ser. No. 16/287,990, filed on Feb. 27, 2019, and a continuation-in-part of U.S. application Ser. No. 16/367, 700, filed on Mar. 28, 2019, application Ser. No. 16/282,166 claims priority under 35 U.S.C. § 119(a) to Korean application number 10-2018-0144289, filed on Nov. 21, 2018, application Ser. No. 16/287,990 claims priority under § 119(a) to Korean application number 10-2018-0134170, filed on Nov. 5, 2018, and application Ser. No. 16/367,700 claims priority under § 119(a) to Korean application number 10-2018-0085506, filed on Jul. 23, 2018, and Korean application number 10-2018-0155681, filed on Dec. 6, 2018, which applications are incorporated herein by reference in its entirety.

BACKGROUND OF THE INVENTION

1. Technical Field

Embodiments of the present disclosure may generally relate to a memory system, and more particularly to a technology for implementing data communication between memory devices.

2. Related Art

In recent times, various mobile communication terminals, for example, smartphones, tablet PCs, etc. have been widely used throughout the world. In addition, demand for a Social Network Service (SNS), a Machine to Machine (M2M) service, a sensor network, etc. from anywhere at any time is rapidly increasing. Therefore, the amount of data, the creation speed of data, and diversity of data are geometrically increasing. In order to process big data, a data processing rate of each memory is of importance and a high-capacity memory device and a high-capacity memory module are also needed.

Therefore, a memory system includes a plurality of memory devices to increase storage capacity. The memory devices of the memory system may be coupled to a controller by sharing data lines therebetween. However, when a large number of memory devices are contained in the memory system, a data loading time is rapidly increasing. In addition, during data communication between the controller and the memory devices, data transfer time and power consumption increase.

BRIEF SUMMARY OF THE INVENTION

Various embodiments of the present disclosure are directed to providing a memory system that substantially obviates one or more issues due to limitations and disadvantages of the related art.

The embodiments of the present disclosure relate to a memory system for implementing direct communication of data between memory devices, and transmitting the data formed in a packet format without designating an address of the data.

In accordance with an embodiment of the present disclosure, a memory system includes a plurality of memory devices configured to allow a data packet composed of data and header information to be directly communicated between the plurality of memory devices, and a memory controller configured to transmit the data packet to a source memory device from among the plurality of memory devices, and receive the data packet from a last memory device from among the plurality of memory devices. Each of the memory devices may be configured to hash the header information to produce a hash address such that the data is accessed, using the hash address, in address regions located at different positions.

In accordance with an embodiment of the present disclosure, a memory system includes a memory controller configured to generate a memory control signal for controlling a read operation or a write operation of data, and a plurality of memory devices configured to perform the read operation or the write operation in response to the memory control signal. The plurality of memory devices includes a first memory device and a second memory device, The first memory device stores a first number of data received from the memory controller, and the second memory device receives a second number of data corresponding to a specific number of data from among the first number of data, copies the second number of data to be generate a third number of data and stores the third number of data in the second memory device, the third number of data being greater than the second number of data.

In accordance with another embodiment of the present disclosure, a memory system includes a first memory device and a second memory device. The first memory device performs a read operation or a write operation of data in response to a memory control signal, and stores a first number of data received through a first data bus and a second data bus. The second memory device receives, through the second data bus, a second number of data corresponding to a specific number of data from among the first number of data from the first memory device, copies the second number of data to generate a third number of data, and stores the number of data in the second memory device, the third number of data being greater than the second number of data.

In an embodiment of the present disclosure, a memory system includes a plurality of memories configured to store data therein, and a pooled memory controller (PMC) configured to perform a map computation by reading input data from the plurality of memories and storing resultant data produced by performing the map computation in the plurality of memories.

In accordance with another embodiment of the present disclosure, a memory system includes a fabric network coupled to at least one processor, and a pooled memory having a plurality of memories and a pooled memory controller, the pooled memory being configured to perform packet relay to the processor through the fabric network, and transmit data stored in at least one memory in response to a request from the processor. The pooled memory controller is configured to perform off-loading a map computations by reading input data stored in the at least one memory and storing in the at least one memory resultant data produced by the map computation.

It is to be understood that both the foregoing general description and the following detailed description of the present disclosure are illustrative and explanatory and are intended to provide further explanation of the disclosure as claimed.

BRIEF DESCRIPTION OF THE DRAWINGS

The above and other features and advantages of the present disclosure will become readily apparent by reference to the following detailed description when considered in conjunction with the accompanying drawings wherein.

DESCRIPTION OF EMBODIMENTS

Reference will now be made in detail to embodiments of the present disclosure, examples of which are illustrated in the accompanying drawings. Wherever possible, the same reference numbers are used throughout the drawings to refer to the same or like portions. Throughout the specification of the present disclosure, if it is assumed that a certain part is connected (or coupled) to another part, the term "connection or coupling" means that the certain part is directly connected (or coupled) to another part and/or is electrically connected (or coupled) to another part through the medium of a third party. Throughout the specification of the present disclosure, if it is assumed that a certain part includes a certain component, the term "comprising or including" means that a corresponding component may further include other components unless a specific meaning opposed to the corresponding component is written. As used in the specification and appended claims, the terms "a", "an", "one", "the" and other similar terms include both singular and plural forms, unless context clearly dictates otherwise. The terms used in the present application are merely used to describe specific embodiments and are not intended to limit the present disclosure. A singular expression may include a plural expression unless otherwise stated in the context.

Figure 1:
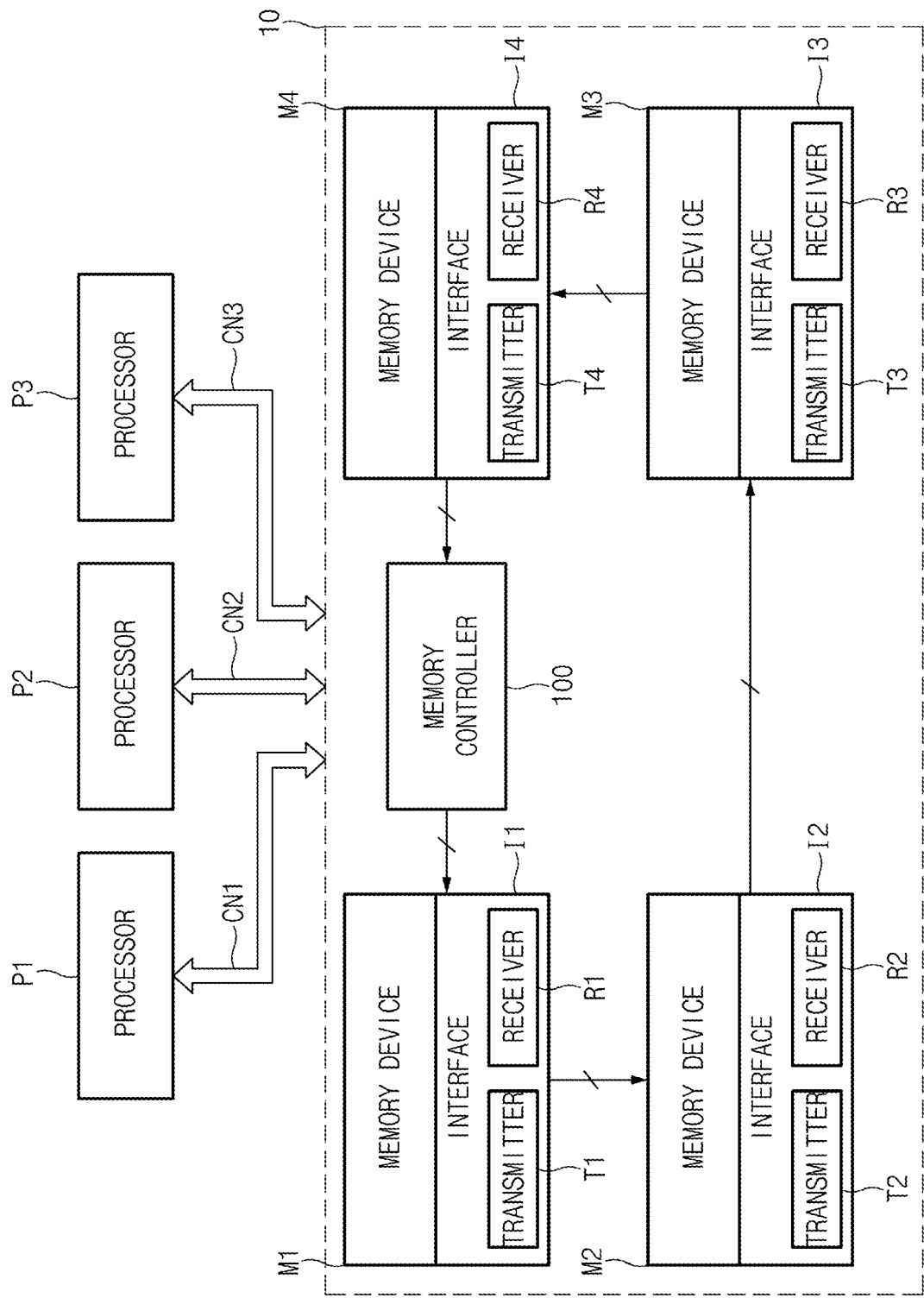
FIG. 1 is a block diagram illustrating a memory system according to an embodiment of the present disclosure.

FIG. 1 is a block diagram illustrating a memory system 10 according to an embodiment of the present disclosure.

The memory system 10 may include a memory controller 100 and a plurality of memory devices M1, M2, M3 and M4.

The memory controller 100 may analyze and process commands requested by the processors P1, P2, and/or P3. In this case, the commands requested by the processors P1 through P3 may include a write command to write data in the memory devices M1 through M4, a read command to read data stored in the memory devices M1 through M4, and the like. Upon receiving the commands from the processors P1 through P3, the memory controller 100 may control operations of background functional blocks using firmware or software needed to drive the memory devices M1 through M4.

The memory controller 100 may be coupled to the processor P1 through a channel CN1. The memory controller 100 may be coupled to the processor P2 through a channel CN2. The memory controller 100 may be coupled to the processor P3 through a channel CN3. In this case, each of the channels CN1 through CN3 may include a data bus through which data is transmitted and received, and a control bus through which a control signal is transmitted and received.

The memory controller 100 may transmit a data packet (to be described later) received through any of the channels CN1 through CN3 to the memory device M1 (i.e., source memory device). The memory controller 100 may transmit a data packet received from the memory device M4 (i.e., the last memory device) to the processor P1 through the channel CN1. The memory controller 100 may transmit the data packet received from the memory device M4 (i.e., the last memory device) to the processor P2 through the channel CN2. The memory controller 100 may transmit a data packet received from the memory device M4 (i.e., the last memory device) to the processor P3 through the channel CN3. In addition, the memory controller 100 may transmit the data packet received from the memory device M4 to the memory device M1.

The memory controller 100 may control operations of the plurality of memory devices M1 through M4. The memory devices M1 through M4 may be configured in a manner that a data packet can be directly communicated between the memory devices M1 through M4 without passing through the memory controller 100. Therefore, the memory controller 100 may transmit the data packet received through any of the channels CN1 through CN3 to the memory device M1, and may transmit the data packet received from the memory device M4 to any of the channels CN1 through CN3.

The memory devices M1 through M4 may be configured in a manner that a data packet can be communicated between the memory devices M1 through M4 without passing through the memory controller 100. In other words, the memory devices M1 through M4 may store data packets received from different memory devices M1 through M4 therein, or may read the stored data packet and transmit the read data packet to different memory devices M1 through M4.

For example, the memory device M1 may store a data packet received from the memory controller 100, or may transmit the stored data packet to the memory device M2. The memory device M2 may store a data packet received from the memory device M1, or may transmit the stored data packet to the memory device M3. The memory device M3 may store a data packet received from the memory device M2, or may transmit the stored data packet to the memory device M4. The memory device M4 may store a data packet received from the memory device M3, or may transmit the stored data packet to the memory controller 100.

Although the embodiment of the present disclosure has illustratively disclosed that first through fourth memory devices M1 through M4 are used for convenience of description and better understanding of the present disclosure, the scope or spirit of the present disclosure is not limited thereto, the number of memory devices is not limited thereto, and the number of memory devices may also be changed as necessary.

In addition, each of the memory devices M1 through M4 according to this embodiment may be formed of a volatile memory. However, the scope or spirit of the present disclosure is not limited thereto, and each of the memory devices M1 through M4 may be implemented as any one of a NAND flash memory, a NOR flash memory, a Phase-Change RAM (PCRAM), a Ferroelectric RAM (FRAM), a Magnetic RAM (MRAM), etc.

The plurality of memory devices M1 through M4 may respectively include a plurality of interfaces I1 through I4 for implementing direct data packet communication between the memory devices M1 through M4.

In this case, the interface I1 of the memory device M1 may include a receiver R1 and a transmitter T1. The receiver R1 may receive a data packet from the memory controller 100. The transmitter T1 may transmit a data packet to the memory device M2.

The interface I2 of the memory device M2 may include a receiver R2 and a transmitter T2. The receiver R2 may receive a data packet from the memory device M1. The transmitter T2 may transmit a data packet to the memory device M3.

The interface I3 of the memory device M3 may include a receiver R3 and a transmitter T3. The receiver R3 may receive a data packet from the memory device M2. The transmitter T3 may transmit a data packet to the memory device M4.

The interface I4 of the memory device M4 may include a receiver R4 and a transmitter T4. The receiver R4 may receive a data packet from the memory device M3. The transmitter T4 may transmit a data packet to the memory controller 100.

Figure 2:
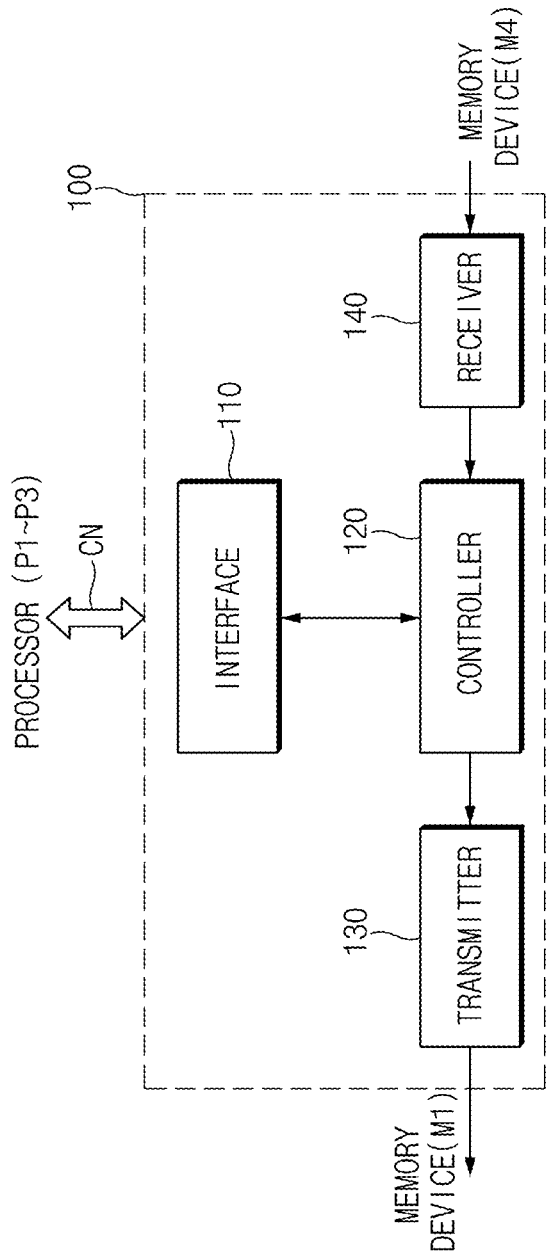
FIG. 2 is a block diagram illustrating a memory controller shown in FIG. 1 according to an embodiment of the present disclosure.

FIG. 2 is a block diagram illustrating the memory controller 100 shown in FIG. 1.

The memory controller 100 may include an interface 100, a controller 120, a transmitter 130, and a receiver 140.

The interface 110 may interface with the external processors P1 through P3 through one or more channels CN. That is, the interface 110 may transmit a data packet received from any of the processors P1 through P3 to the controller 120, or may transmit a data packet received from the controller 120 to any of the processors P1 through P3.

The controller 120 may mediate the access operation between the memory device M1 and the memory device M4, such the memory devices M1 and M4 can be accessed through the mediation of the controller 120. In more detail, the controller 120 may transmit a data packet received through the interface 110 to the transmitter 130. The controller 120 may transmit a data packet received from the receiver 140 to the interface 110. The controller 120 may mediate between transmission/reception (Tx/Rx) operations of data packets such that one data packet received through the interface 110 is prevented from colliding with another data packet received from the receiver 140 through the mediation of the controller 120.

The transmitter 130 may transmit a data packet received from the controller 120 to the memory device M1. The receiver 140 may receive a data packet from the memory device M4, and may transmit the received data packet to the controller 120.

Figure 3:
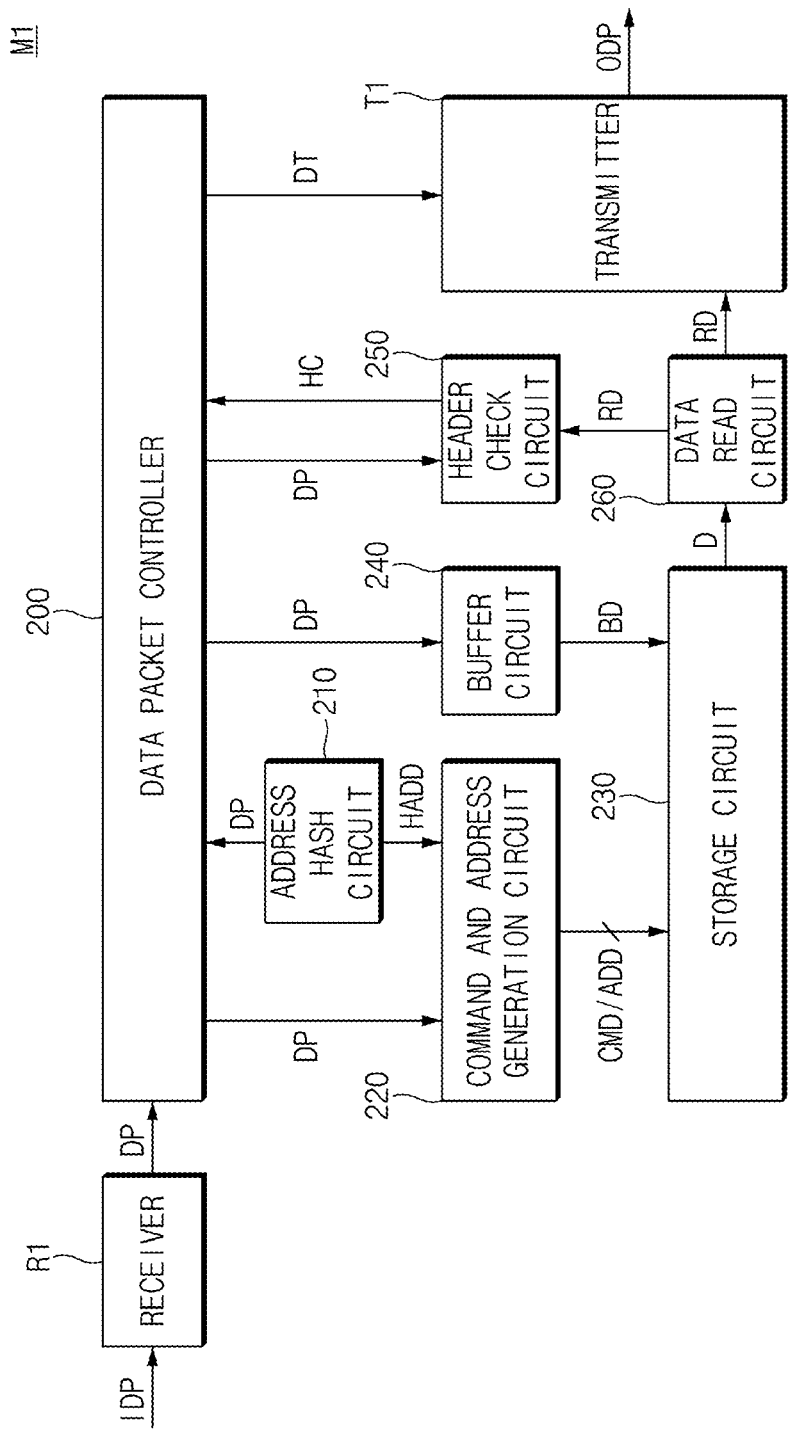
FIG. 3 is a block diagram illustrating a memory device shown in FIG. 1 according to an embodiment of the present disclosure.

FIG. 3 is a detailed block diagram illustrating an example of one memory device M1 from among the memory devices M1 through M4 shown in FIG. 1. The memory devices M1 through M4 may be identical in structure to each other, such that only one memory device M1 is shown in FIG. 3 for convenience of description, and the following embodiment will hereinafter be described with reference to a detailed structure of the memory device M1 as an example.

The memory device M1 may include a data packet controller 200, an address hash circuit 210, a command and address generation circuit 220, a storage circuit 230, a buffer circuit 240, a header check circuit 250, a data read circuit 260, a receiver R1, and a transmitter T1.

The receiver R1 may receive a data packet IDP from the memory controller 100, and may transmit a data packet DP to the data packet controller 200. The data packet controller 200 may control internal operations of the memory device M1 in response to the data packet DP received from the receiver R1.

In other words, the data packet controller 200 may receive the data packet DP from the receiver R1, and may transmit the data packet DP to internal constituent elements of the memory device M1. In this case, the data packet DP may include data and header information. The data packet controller 200 may establish or change queue information (to be described later) of the memory device M1 in response to a header check signal HC received from the header check circuit 250. In addition, the data packet controller 200 may generate a packet transmission signal DT needed to transmit a data packet to the subsequent memory device M2.

The address hash circuit 210 may perform address hashing in response to the data packet DP received from the data packet controller 200, and may generate a hash address HADD. In more detail, the address hash circuit 210 may generate a random physical address (for example, pseudo-random physical address) by hashing header information contained in the data packet DP, and output the pseudo-random physical address as the hash address HADD.

Detailed operations of the address hash circuit 210 will be described later with reference to FIG. 4.

The command and address generation circuit 220 may generate, using the header information of the data packet DP, a command CMD and an address ADD, which are needed to store data in response to the data packet DP and the hash address HADD. The storage circuit 230 may store data BD received from the buffer circuit 240 in response to the command CMD and the address ADD. The buffer circuit 240 may buffer the data of the data packet DP, such that the buffer circuit 240 may transmit the buffered data BD to the storage circuit 230.

The header check circuit 250 may check header information by comparing the data packet DP with read data RD received from the data read circuit 260, and may output a header check signal HC to the data packet controller 200. The data read circuit 260 may read data D stored in the storage circuit 230, and may output the read data RD to the header check circuit 250. In addition, the data read circuit 260 may also output the read data RD to the transmitter T1 as necessary.

The transmitter T1 may receive the read data RD from the data read circuit 260. The transmitter T1 may transmit a data packet ODP to the subsequent memory device M2 in response to the data packet transmission signal DT received from the data packet controller 200.

When the memory system 10 receives physical addresses from the processors P1 through P3 and performs mapping of addresses of the memory devices M1 through M4 by referring to a mapping table, the memory system 10 may have difficulty in accessing the respective memory devices M1 through M4. When the memory system 10 flushes or reads designated data to or from any memory device located far from the processors P1 through P3, a data loading time may be increased and a data transfer rate may be reduced.

Therefore, the memory system 10 according to the embodiment may not designate an address corresponding to a fixed location in one of the memory devices M1 through M4 as where to store data, and may instead transmit the data and address formed in a packet format to a desired destination. Accordingly, the memory system 10 according to the embodiment may perform address hashing using information of the data packet DP, such that addresses can be pseudo-randomly designated for the respective memory devices. In addition, the memory system 10 according to the embodiment may store requested data in the first memory device M1 located nearest to the memory controller 100. As a result, the memory system 10 according to the embodiment may easily access desired data, and may increase a data transfer rate while simultaneously reducing a data loading time in a data flushing process or a data reading process.

Detailed operations of the memory device M1 having the above-mentioned constituent elements are as follows.

First of all, in the read operation for reading data from the memory device M1, the data packet controller 200 may receive the data packet DP having a queue field indicating "Read Request". The address hash circuit 210 may generate the hash address HADD based on header information contained in the data packet DP.

Thereafter, in response to the command CMD and address ADD generated by the command and address generation circuit 220, the memory device M1 may read data D stored in the storage circuit 230. In this case, the address ADD may be of an address layer pseudo-randomly established by the hash address HADD. The storage circuit 230 may read the data D from a pseudo-random address layer as the number of the address ADD increases by one; that is, through the operation of the hash function, locations that appear sequential outside of the memory device M1 may be distributed pseudo-randomly among the values of the address ADD. The data read circuit 260 may receive the data D as an input, and may transmit the read data RD to the header check circuit 250.

Subsequently, the header check circuit 250 may generate a header check signal HC indicating whether header information of the requested data packet DP is identical to information of the read data RD. For example, when the read data RD is in the format 300 of FIG. 5, below, and the data packet DP is in the format 310 of FIG. 6, below, the header check circuit 250 may indicate identical information when all of the address layer number field 302, process ID field 303, and virtual address field 304 of the read data RD have values respectively is equal to values of the address layer number field 312, process ID field 313, and virtual address field 314 of the data packet DP. In an embodiment, the header check circuit 250 also checks the valid information field 301 of the read data RD, and requires that the valid information field 301 indicate valid as an additional condition to indicating identical information. The data packet controller 200 may receive the header check signal HC. If the header check signal HC indicates that the valid information field 301 header information of the requested data packet DP is identical to the corresponding information of the read data RD, the data packet controller 200 may change a current queue field of the data packet DP to indicate "Read Data".

Thereafter, the read data RD received from the data read circuit 260 may be transmitted to the transmitter T1. The data packet controller 200 may activate the data packet transmission signal DT. When the data packet transmission signal DT is activated, the transmitter T1 may transmit the data packet ODP to the subsequent memory device M2. When the header check signal HC indicated identical information, the data packet ODP, if formatted according to FIG. 6, below, may have a queue field 311 indicating "Read Data", a data field 315 equal to the data field 305 of the read data RD, and an address layer number field 312, process ID field 313, and virtual address field 314 having values respectively equal to the corresponding fields of the data packet DP.

If the requested data is read from the first memory device M1, the remaining memory devices M2~M4 may bypass the read operation without execution of the read operation. In more detail, the first memory device M1 may read the data D of the storage circuit 230 through the above-mentioned read operation. The remaining memory devices M2~M4 may allow the data packet controller 200 to immediately activate the data packet transmission signal DT without execution of the above-mentioned read operation. As a result, the remaining memory devices M2~M4 may allow the data packet DP received through the receiver R1 to be immediately bypassed through the transmitter T1, such that the data packet ODP can be transmitted to the memory controller 100.

On the other hand, in the write operation for writing data in the memory device M1, the data packet controller 200 may receive the data packet DP having a queue field indicating "Write Back". The data packet controller 200 may store the received data packet DP in the buffer circuit 240. The address hash circuit 210 may generate the hash address HADD based on header information contained in the data packet DP.

Thereafter, in response to the command CMD and address ADD generated by the command and address generation circuit 220, the memory device M1 may read data D stored in the storage circuit 230. The data read circuit 250 may receive the data D as an input, and may transmit the read data RD to the header check circuit 250.

Subsequently, the header check circuit 250 may check header information of the read data RD, and may generate and transmit the header check signal HC to the packet controller 200. The data packet controller 200 may analyze the header check signal HC. If a valid information bit indicating whether data has already been stored is set to zero "0" (i.e., a disable state), the data packet controller 200 may perform the data write operation. That is, data stored in the buffer circuit 240 may be stored in the storage circuit 230. In addition, in an embodiment, the data packet controller 200 may also perform the data write operation when the valid information indicating whether data has already been stored is set to "1" (i.e., an enable set), and the header check signal HC indicates that information in the header of the data packet DP is equal to corresponding information in the read data RD, as described above for when the queue field indicated "Read Request".

In this case, the address ADD is pseudo-randomly established by the hash address HADD and the address (ADD) number increases by one, such that data BD can be written in the pseudo-random address region. That is, the data BD is written using a value for the address ADD that is one more than the value of the address AD that was used to read the read data RD.

Figure 4:
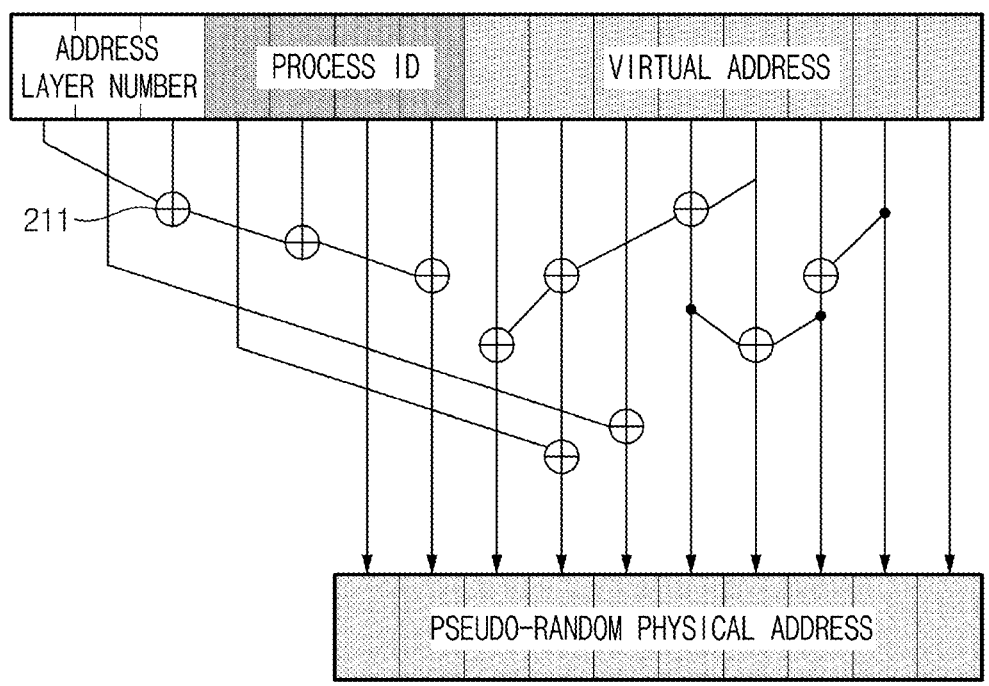
FIG. 4 is a conceptual diagram illustrating an address hash circuit shown in FIG. 3 according to an embodiment of the present disclosure.

FIG. 4 is a conceptual diagram illustrating operations of the address hash circuit 210 shown in FIG. 3.

Referring to FIG. 4, the address hash circuit 210 may perform address hashing in response to the data packet DP received from the data packet controller 200, and may generate the hash address HADD. In other words, the address hash circuit 210 may hash header information consisting of an address layer number, a process ID, and a virtual address, and may thus generate a pseudo-random physical address. In this case, the process ID and the virtual address may be established by one of the processors P1 through P3.

The address hash circuit 210 may include a logic operation circuit 211 which is configured to pseudo-randomly generate a physical address by performing a logic operation among the address layer number, the process ID, and the virtual address. For example, the logic operation circuit 211 may include an exclusive-OR (XOR) logic element configured to perform an XOR logic operation among respective bits of the address layer number, the process ID, and the virtual address, resulting in formation of a pseudo-random physical address. As a result, the respective memory devices M1 through M4 may allow data to be stored in the respective address regions located at different physical positions, such that the data can be stored in the respective address regions located at physically different positions within the memory devices M1 through M4. In the example shown in FIG. 4, wherein the logic operation circuit 211 performs an XOR operation, the two rightmost bits of the pseudo-random physical address are equal to the two rightmost bits of the virtual address, the third from the right bit is equal to the XOR of the second and third bits of the virtual address, the sixth from the right bit is equal to the XOR of the sixth bit of the virtual address and the second bit of the address layer number, and so on.

Figure 5:
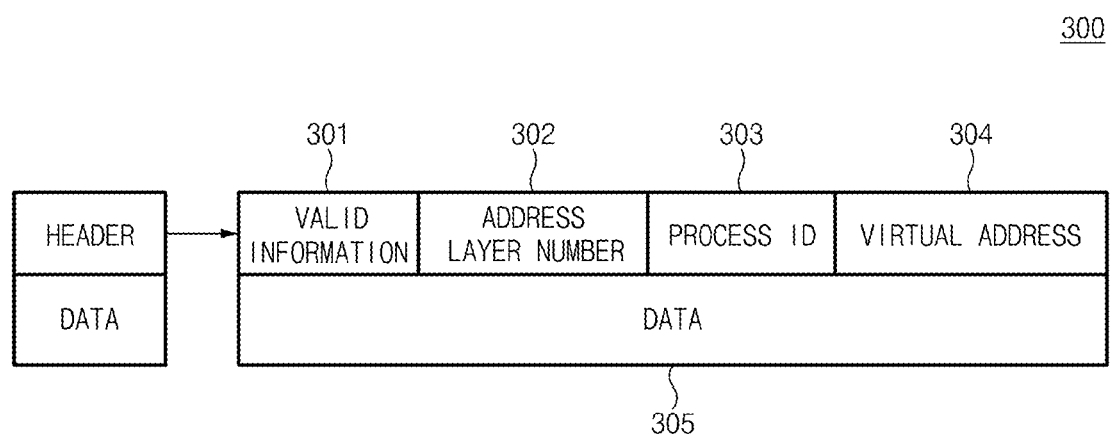
FIG. 5 is a schematic diagram illustrating a data storage format stored in each memory device shown in FIG. 1 according to an embodiment of the present disclosure.

FIG. 5 is a schematic diagram illustrating an example of a data storage format 300 stored in each of the memory devices M1 through M4 shown in FIG. 1. When data is stored in each of the memory devices M1 through M4, the data may be formed in a data format 300 shown in FIG. 5 such that the resultant data provided with the data format 300 of FIG. 5 may be stored in each memory device M1 through M4.

The data format 300 stored in each memory device M1 through M4 may include data 305 and header information. In this case, the term "data" may refer to data stored in each memory device M1 through M4, and the term "header information" may include a valid information field 301, an address layer number field 302, a process ID field 303, a virtual address field 304, etc.

The valid information field 301 may indicate whether data can be stored in each memory device M1 through M4. In order to store data in each memory device M1 through M4, the valid information field may check a bit of the valid information 301 to determine whether the valid information 301 is valid. As a result, when the valid information 301 is not valid, data can be stored in the corresponding memory device.

For example, if the bit of the valid information 301 is set to zero "0", this means that data can be stored in the corresponding memory device at that position. In contrast, if the bit of the valid information 301 is set to "1", this means that the corresponding memory device has already included prestored data such that the corresponding memory device may be unable to store any more data at that position.

The address layer number field 302 may indicate the number of a target address to be used for data storage within the respective memory devices M1 through M4. In accordance with the memory system 10 of this embodiment, an address region to be used for data storage may be pseudo-randomly determined by the address hash circuit 210. Therefore, data can be stored in the respective address regions located at different positions within the respective memory devices M1 through M4.

For example, in the memory device M1, the address layer number may be set to "1". In the memory device M2, the address layer number may be set to "2". In the memory device M3, the address layer number may be set to "3". In the memory device M4, the address layer number may be set to "4". However, the scope or spirit of the present disclosure is not limited thereto, and the data storage position within each of the memory devices M1 through M4 may be arbitrarily changed as necessary.

The process ID field 303 may indicate a unique number of a specific processor which has requested a data service from one memory device selected from among the plurality of processors P1 through P3. In addition, the virtual address field 304 may be an address used to pseudo-randomly generate the physical address to be used for data storage within each of the memory devices M1 through M4.

Figure 6:
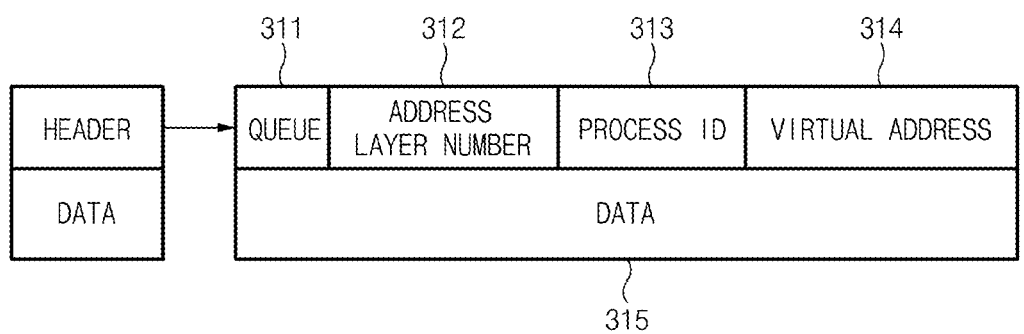
FIG. 6 is a schematic diagram illustrating a data stream format communicated between the respective memory devices shown in FIG. 1 according to an embodiment of the present disclosure.

FIG. 6 is a schematic diagram illustrating an example of a data stream format 310 (that is, a format of a data packet) communicated between the respective memory devices M1 through M4 shown in FIG. 1. When data is communicated between the respective memory devices M1 through M4, data may be formed in a data format 310 shown in FIG. 6, such that the resultant data provided with the data format 310 of FIG. 6 may be communicated between the respective memory devices M1 through M4.

The data format communicated between the respective memory devices M1 through M4 may include data 315 and header information. In this case, the header information may include a queue information field 311, an address layer number field 312, a process ID field 313, a virtual address field 314, etc.

The queue information may indicate operational information of data that is communicated between the respective memory devices M1 through M4. The queue information field 311 may include one of "Read Request", "Read Data", "Write Back", etc. "Read Request" indicates that the communication is a request for reading data that is communicated between the respective memory devices M1 through M4. "Read Data" indicates that the communication is carrying stored data that has been read from one of the memory devices M1 through M4. "Write Back" indicates that the communication is a request for storing data in one of the memory devices M1 through M4.

In accordance with this embodiment, the memory controller 100 may transmit the "Read Request" communications and the "Write Back" communications to the memory device M1. The memory controller 100 may transmit the "Read Data" communication received from the memory device M4 to the corresponding processor established by header information. In addition, in an embodiment the memory device M4 may retransmit the "Read Data" communication acting as the "Write Back" information to the memory device M1 in order to potentially store recently read data into the memory device M1 to speed subsequent access to that data.

Figure 7:
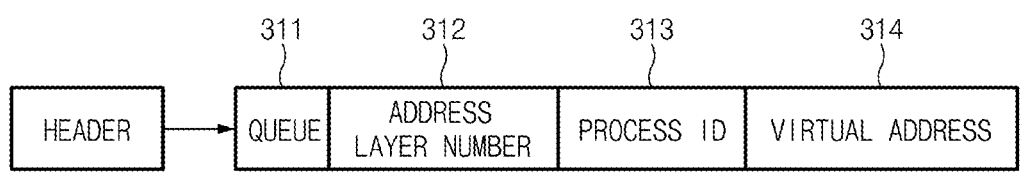
FIG. 7 is a schematic diagram illustrating data request format requested for a memory device shown in FIG. 1 according to an embodiment of the present disclosure.

FIG. 7 is a schematic diagram illustrating an example of a data request format 320 requested for each of the memory devices M1 through M4 shown in FIG. 1 according to an embodiment of the present disclosure. When the "Read Request" information is communicated between the respective memory devices M1 through M4, header information may be formed in a data format 320 shown in FIG. 7, such that the header information provided with the data format of FIG. 7 may be communicated between the respective memory devices M1 through M4.

In an operation corresponding to the "Read Request" information, the data format communicated between the respective memory devices M1 through M4 may include only header information as described with respect to FIG. 6. In this case, the header information may include a queue information field 311, an address layer number field 312, a process ID field 313, a virtual address field 314, etc.

Figure 8:
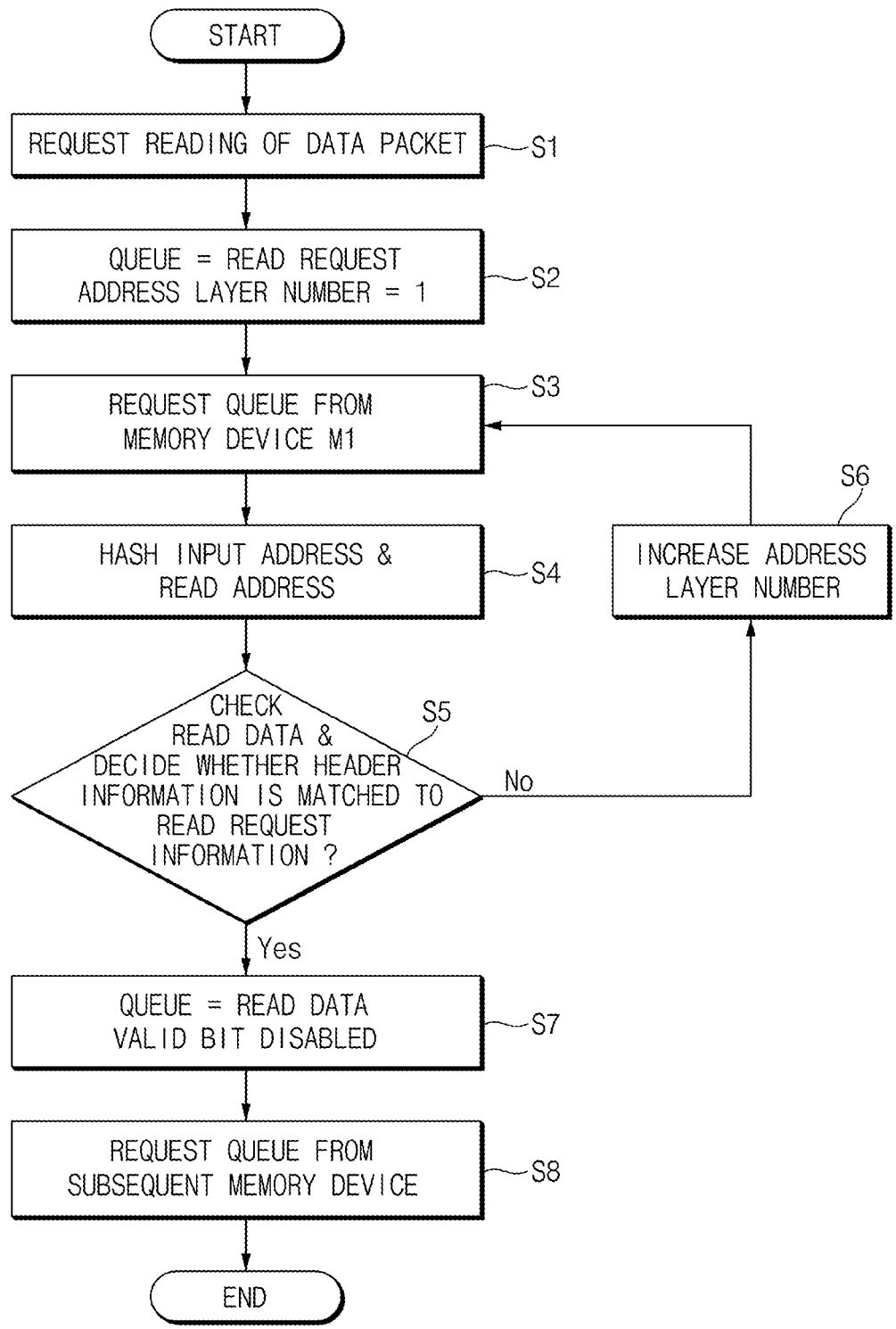
FIGS. 8 and 9 are flowcharts illustrating operations of a memory system according to an embodiment of the present disclosure.

FIG. 8 is a flowchart illustrating operations of the memory system 10 according to an embodiment of the present disclosure. Although an illustrative operation corresponding to the "Read Request" information and an illustrative operation corresponding to the "Read Data" information will hereinafter be described with reference to FIG. 8 for convenience of description and better understanding of the present disclosure, the scope or spirit of the present disclosure is not limited thereto.

As step S1, the memory controller 100 may receive a data packet including the "Read Request" indication from the processor P1 in step S1. In response, at step S2 the memory controller 100 creates header information for transmission to the memory device M1, the header information including a queue field indicating "Read Request", and an address layer number field set to "1". In an embodiment, the header information may also include a process ID and a virtual address each derived from the data packet received by the memory controller 100. At step S3, the memory controller 100 uses the created header information to request a "Read Request" queue from the next memory device, which for the memory controller 100 is the memory device M1.

At step S4, the memory device receiving the "Read Request" may hash a received address, and may read the stored address using the result of the hash. In an embodiment, the received address includes the address layer number field, the process ID, and the virtual address included in the received header information. At step S5, the memory device may check the read data through the header check circuit 250. That is, the header check circuit 250 may determine whether the header information is matched to the "Read Request" information.

If the header information is not matched to the "Read Request" information and valid data is not found in the memory device, and the memory device is one of M1 to M3, at step S6 the address layer number of the read request may increase by one and the read request may then be sent to the next memory device for processing beginning at step S3. For memory devices M1, M2, and M3, the next memory device is memory devices M2, M3, and M4, respectively.

In this way, when valid data is also not found in each of the memory devices M2 and M3, the "Read Request" queue may be finally transmitted up to the memory device M4. If valid data is also not found in the last memory device M4, the "Read Request" queue may be retransmitted to the first memory device M1. That is, for a read request, the memory device M1 is the next memory device for the memory device M4, for the purpose of forwarding an unsatisfied read request. For example, a maximum program loop number may be set in order to prevent an infinite repetition of program loops.

As a result, in the memory device M1, another address different from a first hash address may be designated, by virtue of the increased memory layer number. That is, the address is continuously recomputed in the same manner as in FIG. 4, such that a Read Request being received by a memory device for the second time (by being looped back from memory device M4) will have a pseudo-random physical than when the read request was first received by the memory device. The address to be hashed in the memory device M1 can be changed within the memory device M1.

On the other hand, when the header information is matched to the "Read Request" information, at step S7, in order to read the stored data from the memory device, the queue field of a data packet may be set to indicate "Read Data", and the read data used as the data of the data packet. In an embodiment, a valid information bit from among the header information of the memory device M1 having found such valid data may be changed to "0" in step S7. In more detail, since valid data has already been read from the memory device M1, the valid information bit of the position that the stored data was read from may be set in such a manner that it is possible to store subsequent input data to that position during a subsequent write operation. In other words, the "Read Data" operation may be a "destructive read" that effectively removes the read data from the memory device.

Thereafter, at step S8 the memory system 10 may transmit a header including a queue field indicating "Read Data" to the next memory device (e.g., the memory device M2 when the present memory device is the memory device M1), and may transmit the read data to the memory device. If data is finally transmitted in this manner to the last memory device M4 and then to the memory controller 100, the memory controller 100 may transmit the data packet of the memory device M4 to the made the read request (e.g., processor P1).

Figure 9:
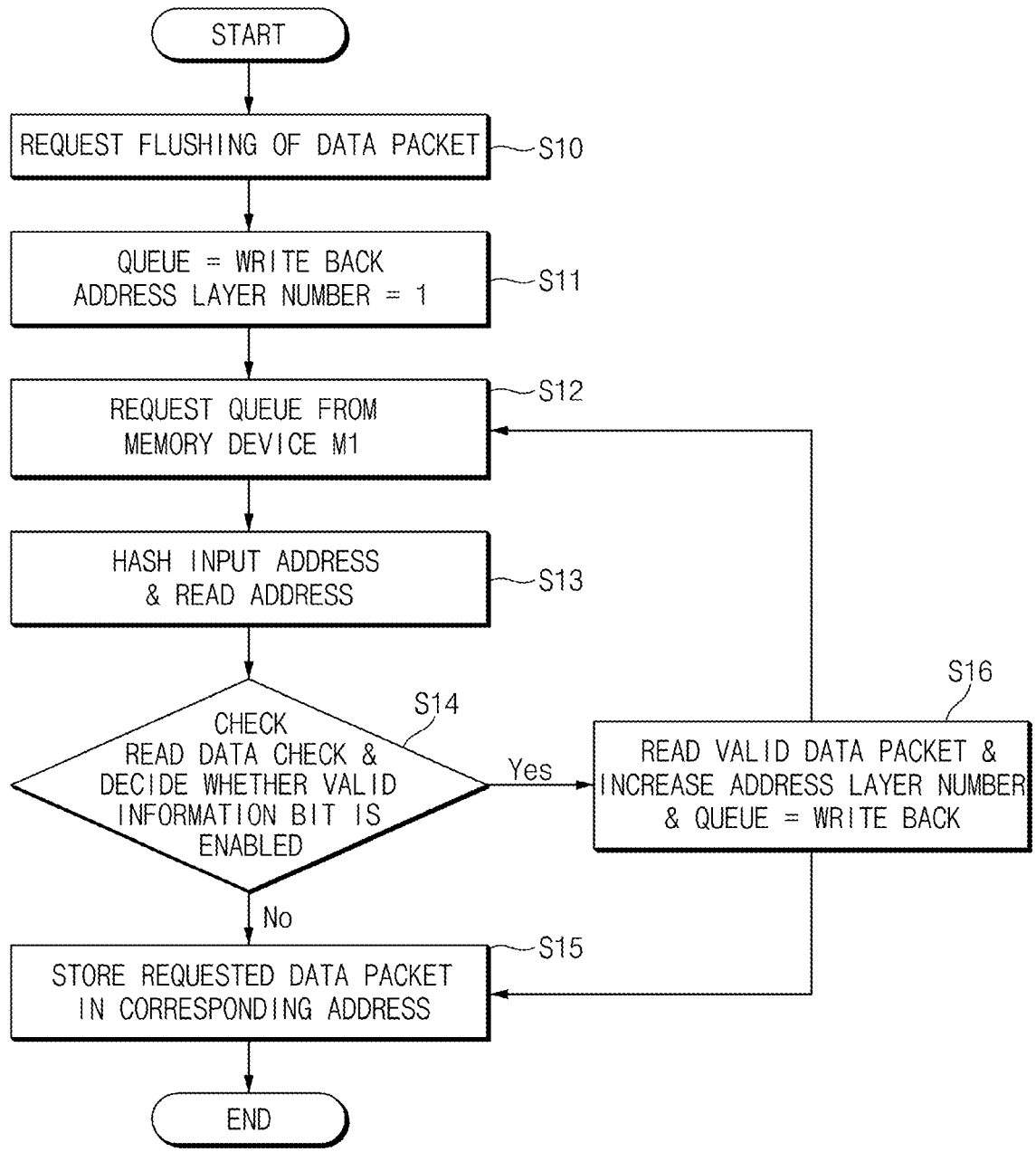

FIG. 9 is a flowchart illustrating operations of the memory system 10 according to an embodiment of the present disclosure. In more detail, FIG. 9 illustrates operations of the "Write Back" operation.

At step S10, The memory controller 100 may receive a data packet provided with a flush request indication from the processor P1. The flush request indication may be a request to potentially flush data prestored in the memory device M1, push the flushed data to the subsequent memory device M2, and store new data received from the processor P1 in the memory device M1.

As a result, at step S11, header information have a queue field indicating "Write Back" and the address layer number set to "1" is transmitted from the memory controller 100 to the memory device M1. In an embodiment, the header information may also include a process ID and a virtual address each derived from the data packet received by the memory controller 100. At step S12, the memory controller 100 may request a "Write Back" queue such that data can be stored in the next memory device, that is, memory device M1.

At step S13, the memory device receiving the "Write Back" request may hash a received address, and may read data at the stored address using the result of the hash. In an embodiment, the received address includes the address layer number field, the process ID, and the virtual address included in the received header information. At step S14, the memory device M1 may check the read data through the header check circuit 250. That is, the header check circuit 250 may check the valid information field of the header information, and may thus determine whether the valid information bit in the data read from the memory device is set to "1" (i.e., an enable state) or "0" (i.e., a disable state).

If the valid information bit has the disable state, at step S14 the memory device proceeds to S15; otherwise the memory device proceeds to S16. At S15, the memory system 10 may store the requested data packet in the corresponding address, and may set the valid information bit to the value of "1" (i.e., the enable state). In contrast, when valid information bit has the enable state, at step S16 the memory device increments address layer number in the header information read from memory device, creates a data packet having the address layer number increases by one, having the processor ID and virtual address read from the memory device, and having the queue field indicating "Write Back", and send the created data packet to the next memory device. The present memory device then proceeds to step S15, and the next memory device then processes the new write back data packet starting at step S12.

That is, during the "Write Back" operation, the memory system 10 may store the requested data in the first memory device M1 located nearest to the memory controller 100. When data is stored in the memory device M1 located nearest to the memory controller 100, the memory system 10 may easily access the memory device M1 in a subsequent data read operation such that the stored data of the memory device M1 can be easily accessed.

The memory system 10 according to this embodiment may check the valid information field of the header information read from the location in the memory device where the requested data is to be stored, and may thus determine the presence or absence of the prestored data in the memory device M1 according to the checked result. When valid data is not present in the memory device M1 in the location where the requested data is to be stored, the memory system 10 may immediately store the requested data in the memory device M1. In contrast, when valid data is present in the memory device M1 in the location where the requested data is to be stored, the memory system 10 may transmit the data that was present in the memory device M1 to the subsequent memory device M2, and may store the requested data in the memory device M1. If valid data is also found in the memory device M2, the memory system 10 may sequentially transmit data to the memory devices M3 and M4 such that the resultant data can be sequentially stored in the memory devices M3 and M4.

Figure 10:
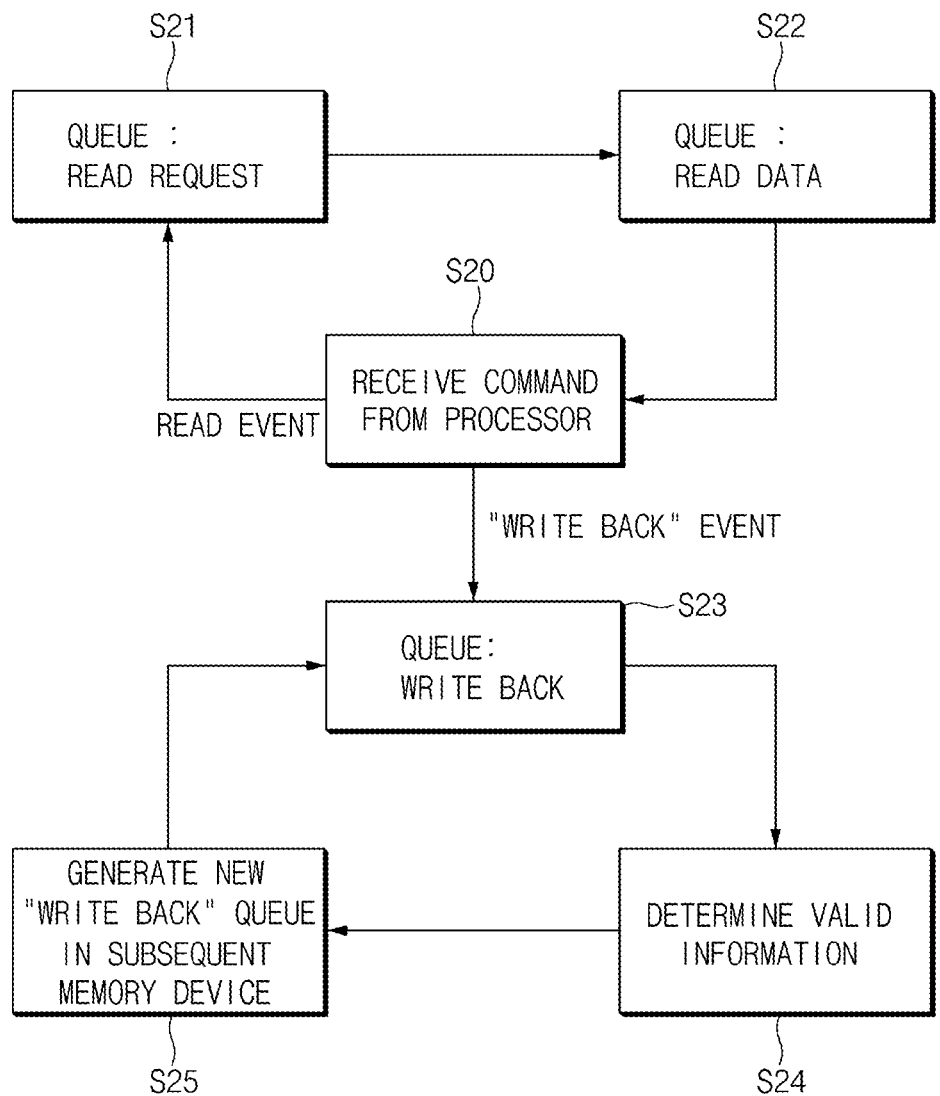
FIG. 10 is a conceptual diagram illustrating queue change of a memory system according to an embodiment of the present disclosure.

FIG. 10 is a conceptual diagram illustrating queue changes of the memory system 10 according to an embodiment of the present disclosure. In more detail, FIG. 10 is a conceptual diagram illustrating a queue change process of header information according to request signals received from the processors P1 through P3.

For example, at step S20 the memory controller 100 may receive a command from the first processor P1 from among the plurality of processors P1 through P3. The processor P1 may request information from the memory control unit 100 by designating the process ID and the virtual address.

In response to receiving the command from the processor P1, the memory controller 100 may transmit a data packet to the memory device M1. The data packet transmitted to the memory device M1 may include data and header information. A value of the queue field contained in the header information of the data packet may be set according to the command from the processor P1.

That is, upon receiving a read event from the processor P1, at step S21 the queue field of the header information may be set to "Read Request". Then, the memory controller 100 may request that the memory device M1 perform the data read operation. If the queue information is changed to "Read Data", the memory controller 100 may read data from the memory device M1 and may transmit the read data to the processor P1 in step S22.

In addition, upon receiving a "Write Back" event from the processor P1, at step S23 the queue field of the header information may be set to "Write Back". At step S24, the memory device M1 may check valid information of the header information so as to determine whether data can be stored in the memory device M1. If it is impossible to store the requested data in the memory device M1 because valid data has already been stored at the pertinent location in the memory device M1, at step S25 the memory system 10 may generate a new "Write Back" queue for a subsequent memory device (e.g., memory device M2).

As is apparent from the above description, the memory system according to the embodiments of the present disclosure may increase a data transfer rate while simultaneously reducing traffic related to data addressing.

Figure 11:
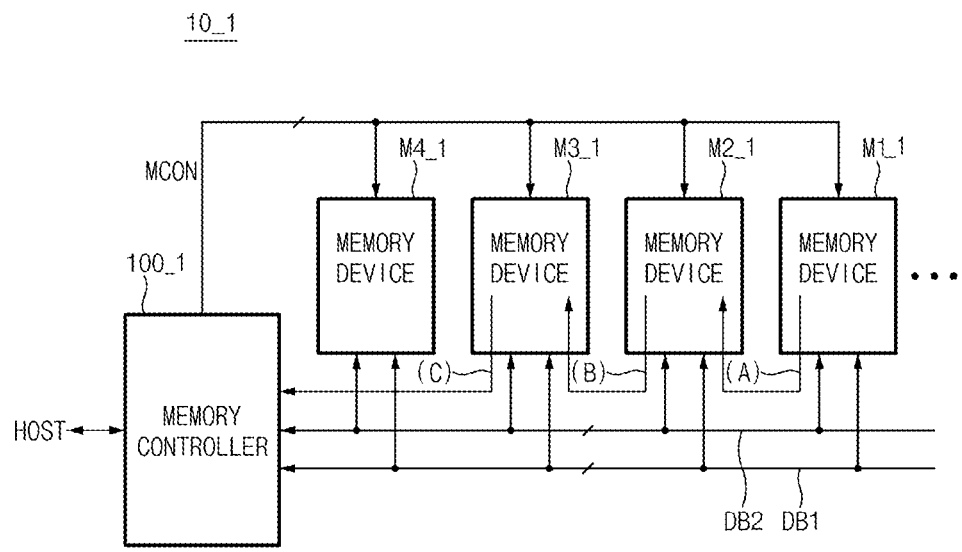
FIG. 11 illustrates a memory system according to an embodiment of the present disclosure.

FIG. 11 illustrates a memory system 10_1 according to an embodiment of the present disclosure.

Referring to FIG. 11, the memory system 10_1 may include a memory controller 100_1 and a plurality of memory devices M1_1, M2_1, M3_1, and M4_1.

The memory controller 100_1 may receive a command from a host, and may generate a memory control signal MCON based on the command received from the host to thereby control the plurality of memory devices M1_1~M4_1. The memory controller 100_1 may include a host interface (not shown) to interface with the host.

For example, the memory controller 100_1 may analyze and process the command received from the host. In this case, the command received from the host may include a write command to write data in the memory devices M1_1~M4_1, a read command to read data stored in the memory devices M1_1~M4_1, or the like.

Upon receiving the command from the host, the memory controller 100_1 may control operations of background functional blocks according to firmware or software for driving the memory devices M1_1~M4_1.

The memory devices M1~M4 may provide data services upon receiving the memory control signal MCON from the memory controller 100_1. For example, in response to the memory control signal MCON, the memory devices M1_1~M4_1 may store data received from the memory controller 100_1, or may read data stored therein and provide the read data to the memory controller 100_1.

Although the embodiment of the present disclosure has illustratively disclosed that the four memory devices M1~M4 are used for convenience of description and better understanding of the present disclosure, the scope or spirit of the present disclosure is not limited thereto. In other embodiments, the number of memory devices included in the memory system 10_1 may be changed as necessary.

In addition, each of the memory devices M1_1~M4_1 may be a volatile memory. However, the scope or spirit of the present disclosure is not limited thereto, and thus each of the memory devices M1_1~M4_1 may be implemented as a non-volatile memory such as any one of a NAND flash memory, a NOR flash memory, a phase-change RAM (PCRAM), a ferroelectric RAM (FRAM), a magnetic RAM (MRAM), etc.

The memory devices M1_1~M4_1 may be coupled to the memory controller 100_1 through data buses DB1 and DB2, such that the memory devices M1_1~M4_1 may transmit and receive data to and from the memory controller 100_1. In this case, the memory devices M1_1~M4_1 may share data received through the data bus DB2 with each other.

That is, data may be directly transmitted between the memory devices M1_1~M4_1 through the data bus DB2 without passing through the memory controller 100_1.

The memory devices M1_1~M4_1 may share the data bus DB2 through which some of data can be transmitted. For example, the memory device M1_1 from among the memory devices M1_1~M4_1 may directly transmit data to the memory device M2_1 through the data bus DB2 without using the memory controller 100_1, as represented by a transmission path (A). Similarly, the memory device M2_1 from among the memory devices M1_1~M4_1 may directly transmit data to the memory device M3_1 through the data bus DB2 without using the memory controller 100_1, as represented by a transmission path (B). The memory device M1_1~M4_1 may transmit the read data to the memory controller 100_1 through the data buses DB1 and DB2, as represented by a transmission path (C).

Figure 12:
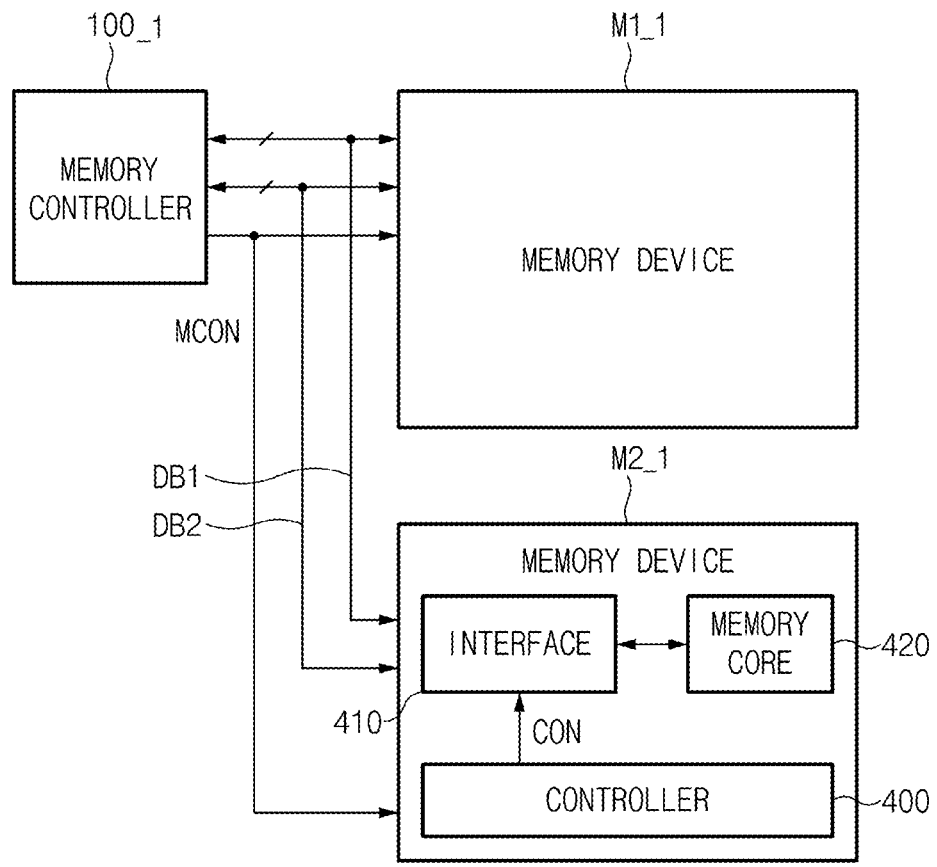
FIG. 12 illustrates a memory device shown in FIG. 11 according to an embodiment of the present disclosure.

FIG. 12 illustrates each of the memory devices M1_1~M4_1 shown in FIG. 11 according to an embodiment of the present disclosure. The memory devices M1_1~M4_1 are identical in structure to each other, such that only two memory devices M1_1 and M2_1 are shown in FIG. 12 for convenience of description, and this embodiment will hereinafter be described with reference to a detailed structure of the memory device M2_1 as an example.

Referring to FIG. 12, the memory device M2_1 may include a controller 400, an interface 410, and a memory core 420.

In response to the memory control signal MCON from the memory controller 100_1, the controller 400 may generate a control signal CON for determining a control mode of data in the memory device M2. For example, in response to the memory control signal MCON, the controller 400 may output the control signal CON to set a normal mode or a compression mode.

The interface 410 may perform interfacing between the memory core 420 and the data buses DB1 and DB2 in response to the control signal CON. The interface 410 may include a first connection circuit to select both of the data buses DB1 and DB2 in response to the control signal CON, and a second connection circuit to select only the data bus DB2 in response to the control signal CON.

For example, when the control signal CON is set to the normal mode, the interface 410 may receive the entire data through the data buses DB1 and DB2, and may transmit the received entire data to the memory core 420. On the other hand, when the control signal CON is set to the compression mode, the interface 410 may receive some of the entire data, e.g., partial data, through the data bus DB2, and may transmit the receive partial data to the memory core 420.

In the normal mode, the memory core 420 may receive the entire data from the data buses DB1 and DB2 through the interface 410, and may store the received entire data in a bank of the memory device M2_1 that is to be described later. In the compression mode, the memory core 420 may receive some of the entire data, i.e., the partial data, from the data bus DB2 through the interface 410. The memory core 420 may store data corresponding to the entire data in the bank of the memory device M2 by copying the partial data received through the interface 410. Data loaded in the data bus DB2 may be directly transmitted to each of the memory devices M1_1 and M2_1 without passing through the memory controller 100_1.

For example, the memory device M1_1 may operate in the normal mode so that a read or write operation for the entire data can be carried out. In addition, when the memory device M1_1 performs the read or write operation in the normal mode, the memory device M2_1 may operate in the compression mode to store data corresponding to the entire data by copying the partial data. In this case, the memory controller 100_1 may provide the memory device M1_1 and the memory device M2_1 with the same data.

As described above, the memory device M2_1 may copy the partial data received through the data bus DB2 in the memory core 420 of the memory device M2_1 in response to the memory control signal MCON, and may store the copied data in the memory core 420.

Therefore, according to the embodiments of the present disclosure, data can be directly transmitted between the memory devices, and only some of the entire data is received and copied to generate parallel data, and the parallel data is stored in a memory device. As a result, a data transfer time and power consumption can be reduced.

Figure 13:
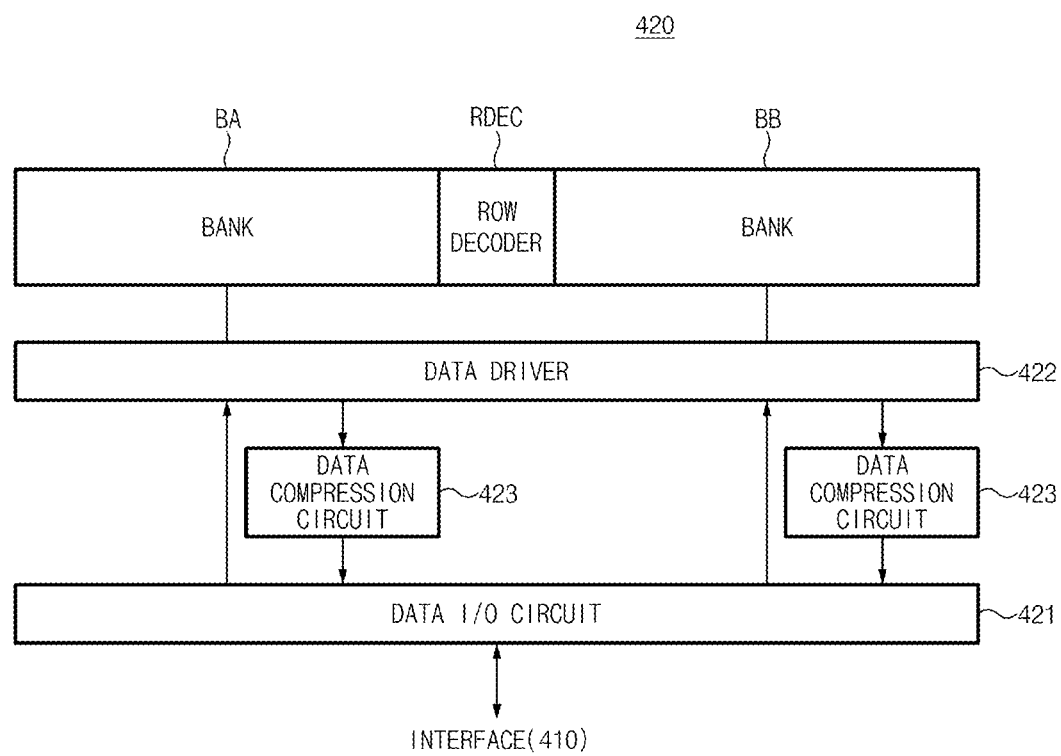
FIG. 13 illustrates a memory core shown in FIG. 12 according to an embodiment of the present disclosure.

FIG. 13 illustrates the memory core 400 shown in FIG. 12 according to an embodiment of the present disclosure.

Referring to FIG. 13, the memory core 420 may include a data input/output (I/O) circuit 421, a data driver 422, a data compression circuit 423, a row decoder RDEC, and a plurality of banks BA and BB.

FIG. 13 shows the two banks BA and BB that are included in the memory core 420 for convenience of description and better understanding of the present disclosure. However, the scope or spirit of the present disclosure is not limited thereto, and the number of banks may be changed as necessary.

In this case, the data I/O circuit 421 may communicate with the interface 300 of the memory device M2_1, shown in FIG. 12. That is, during a write operation, the data I/O circuit 421 may transmit write data received through the interface 410 to the data driver 422. During a read operation, the data I/O circuit 421 may transmit read data received through the data compression circuit 423 to the interface 410.

During the write operation, the data driver 422 may drive the write data received from the data I/O circuit 421, and may transmit the write data to the banks BA and BB. During the read operation, the data driver 422 may drive the read data received from the banks BA and BB, and may transmit the read data to the data compression circuit 423.

During the read operation, the data compression circuit 423 may compress the read data received from the data driver 422, and may transmit the compressed read data to the data I/O circuit 421. That is, the read data received from the banks BA and BB may be compressed by the data compression circuit 423, and the compressed read data may be transmitted to the data I/O circuit 421. The compressed read data, which is output through the data I/O circuit 422, is transmitted to the data bus DB2 through the interface 410, such that a data loading time caused by data transmission can be reduced in the read operation.

During the write operation, the banks BA and BB may store the write data received from the data driver 422. During the read operation, each of the banks BA and BB may read the stored data, and may output the read data to the data driver 422. During the write operation or the read operation, the row decoder RDEC may select row lines of the respective banks BA and BB, and may allow cells to which the selected row lines are coupled to be accessed.

Figure 14:
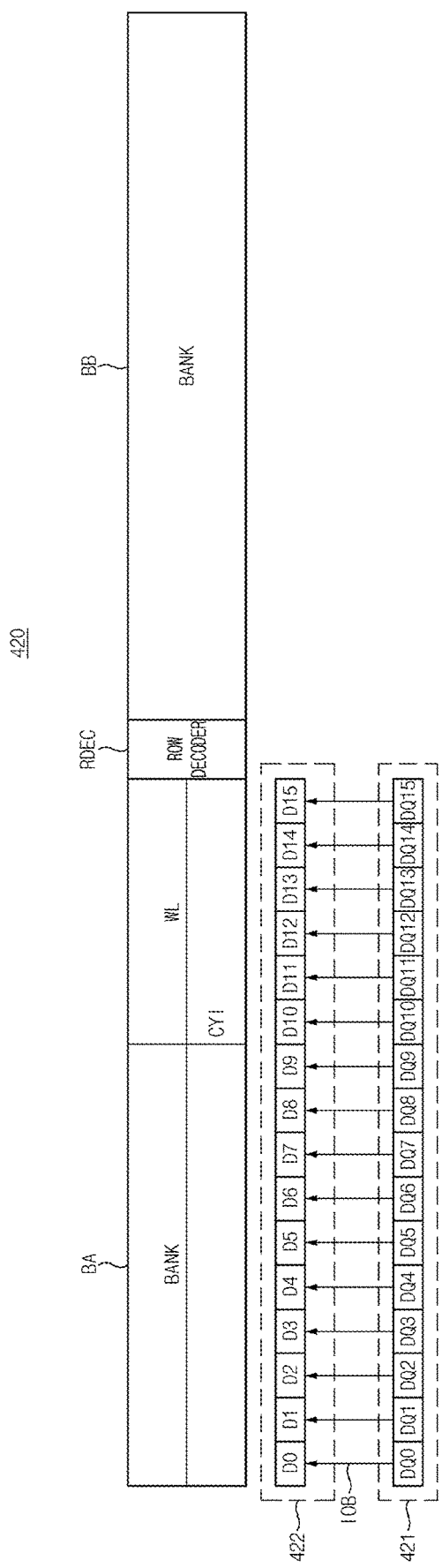
FIG. 14 illustrates a memory core shown in FIG. 13 according to an embodiment of the present disclosure.

FIG. 14 illustrates an example of the memory core 420 shown in FIG. 13 according to an embodiment of the present disclosure.

Referring to FIG. 14, the memory core 400 may include a data I/O circuit 421, a data driver 422, a row decoder RDEC, and banks BA and BB.

The embodiment of FIG. 14 will hereinafter be described focusing upon a write operation of data. In an embodiment, data, which has been read from a reference memory device, for example, the memory device M1_1 shown in FIG. 12, may be stored in a target memory device, for example, the memory device M2_1 shown in FIG. 12. In this embodiment, the data read from the memory device M1_1 is stored in the memory core 400 of FIG. 14.

In addition, the embodiment of FIG. 14 discloses an illustrative case in which the control signal CON from the controller 400 shown in FIG. 12 is set to the normal mode. In the normal mode, the memory core 420 may receive the entire data of the data buses DB1 and DB2 through the interface 410 shown in FIG. 12, and may store the received entire data in a bank, e.g., the bank BA. The embodiment of FIG. 14 illustratively discloses that the received entire data is stored in the bank BA from among the banks BA and BB for convenience of description. However, the scope or spirit of the present disclosure is not limited thereto, and the received entire data may be stored in the bank BB from among the banks BA and BB or in both of the banks BA and BB, as necessary.

For example, it is assumed that first data received through the data bus DB1 is denoted by (×12) and second data received through the data bus DB2 is denoted by (×4). As a result, the entire data received through the data buses DB1 and DB2 may be denoted by (×16). That is, the entire data includes the first data and the second data. However, the scope or spirit of the present disclosure is not limited thereto, and the number of data segments to be transmitted through the data buses DB1 and DB2 may be changed as necessary.

During the normal mode, the interface 410 may transmit the entire data denoted by (×16) to the data I/O circuit 421 of the memory core 420. In other words, when a total number of data pins of the memory core 420 is 16, 16 data DQ0~DQ15 received through the 16 data pins may be input to the data I/O circuit 421. The data I/O circuit 421 may receive the 16 data DQ0~DQ15 from the interface 410, and may transmit the received data DQ0~DQ15 to an internal I/O bus IOB.

As a result, the data driver 422 may drive the data DQ0~DQ15 received through the internal I/O bus IOB, and may transmit data D0~D15 corresponding to the data DQ0~DQ15, respectively, to the bank BA. The bank BA may store the data D0~D15 received through the data driver 422. When a word line WL is selected by the row decoder RDEC and a column line is selected by a column selection signal CYI, the bank BA may write each of the data D0~D15 in a corresponding cell designated by the selected word line WL and the selected column line.

Figure 15:
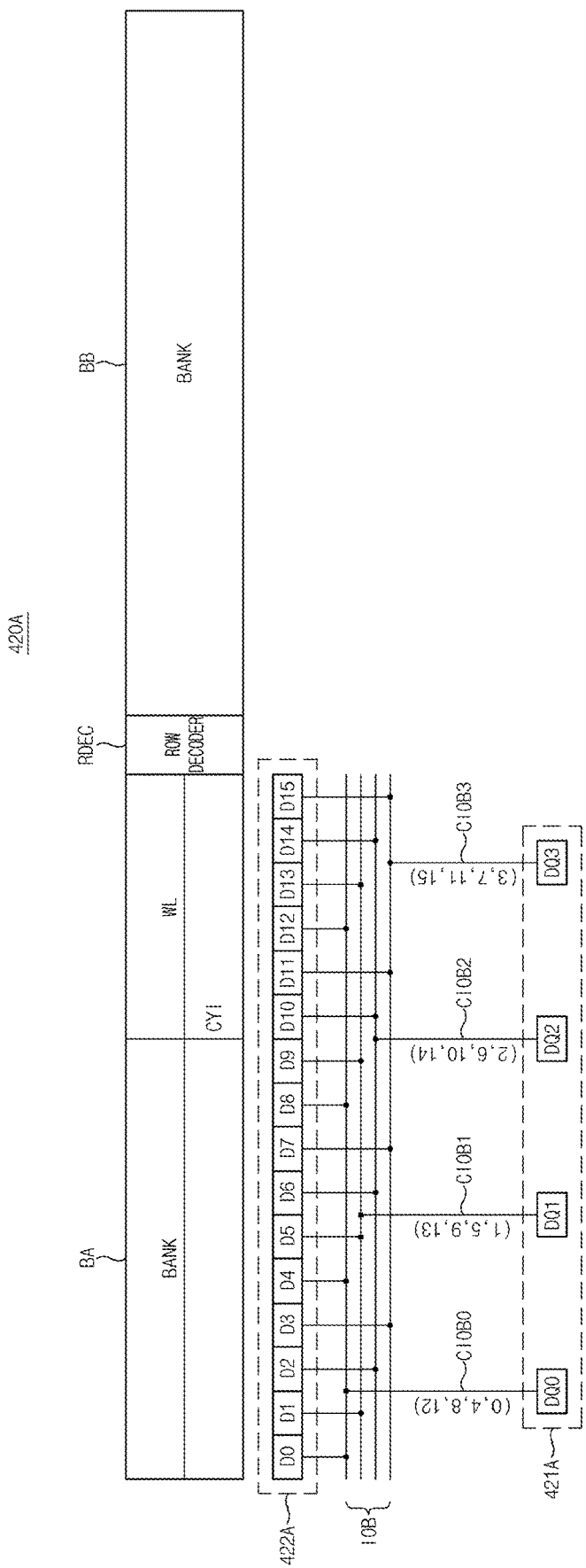
FIG. 15 illustrates a memory core shown in FIG. 13 according to another embodiment of the present disclosure.

FIG. 15 illustrates another example of the memory core 420 shown in FIG. 13 according to another embodiment of the present disclosure.

Referring to FIG. 15, a memory core 420A may include a data I/O circuit 421A, a data driver 422A, a row decoder RDEC, and banks BA and BB.

The embodiment of FIG. 15 will hereinafter be described focusing upon a write operation of data for convenience of description. Data, which has been read from a reference memory device, for example, the memory device M1_1 shown in FIG. 12, may be stored in a target memory device, for example, the memory device M2_1 shown in FIG. 12. In this embodiment, the data read from the memory device M1_1 is stored in the memory core 420A.

In addition, the embodiment of FIG. 15 discloses an illustrative case in which the control signal CON from the controller 400 shown in FIG. 12 is set to the compression mode. In the compression mode, the memory core 420A may receive some of the entire data of the data buses DB1 and DB2 through the interface 410 shown in FIG. 12, and may store the received data in the bank BA. The embodiment of FIG. 15 discloses that the received data is stored in the bank BA from among the banks BA and BB for convenience of description. However, the scope or spirit of the present disclosure is not limited thereto, and the received data may be stored in the bank BB from among the banks BA and BB or in both of the banks BA and BB, as necessary.

For example, it is assumed that data received through the data bus DB1 is denoted by (×12) and data received through the data bus DB2 is denoted by (×4). In the compression mode, the interface 410 may transmit only the data denoted by (×4) and received through the data bus DB2 to the memory core 420A.

The data I/O circuit 421A may receive four data DQ0~DQ3 from the interface 410, and may transmit the received data DQ0~DQ3 to common I/O buses CIOB0~CIOB3. The data DQ0~DQ3 applied to the common I/O buses CIOB0~CIOB3 may be copied through an internal I/O bus IOB, such that data D0~D15 corresponding to the data DQ0~DQ3 may be transmitted to the bank BA.

For example, the data DQ0 applied to the common I/O bus CIOB0 may be copied into several data D0, D4, D8, and D12 through the internal I/O bus IOB. The data DQ1 applied to the common I/O bus CIOB1 may be copied into several data D1, D5, D9, and D13 through the internal I/O bus IOB. The data DQ2 applied to the common I/O bus CIOB2 may be copied into several data D2, D6, D10, and D14 through the internal I/O bus IOB. In addition, the data DQ3 applied to the common I/O bus CIOB3 may be copied into several data D3, D7, D11, and D15 through the internal I/O bus IOB.

Therefore, the 16 data D0~D15 may be applied to the bank BA through the internal I/O bus IOB. The data driver 422A may drive the data D0~D15 received through the internal I/O bus IOB, and may transmit the data D0~D15 to the bank BA. In the bank BA, a word line WL may be selected by the row decoder RDEC, and a column line may be selected by a column selection signal CYI, such that the data D0~D15 may be stored in corresponding cells of the bank BA.

Figure 16:
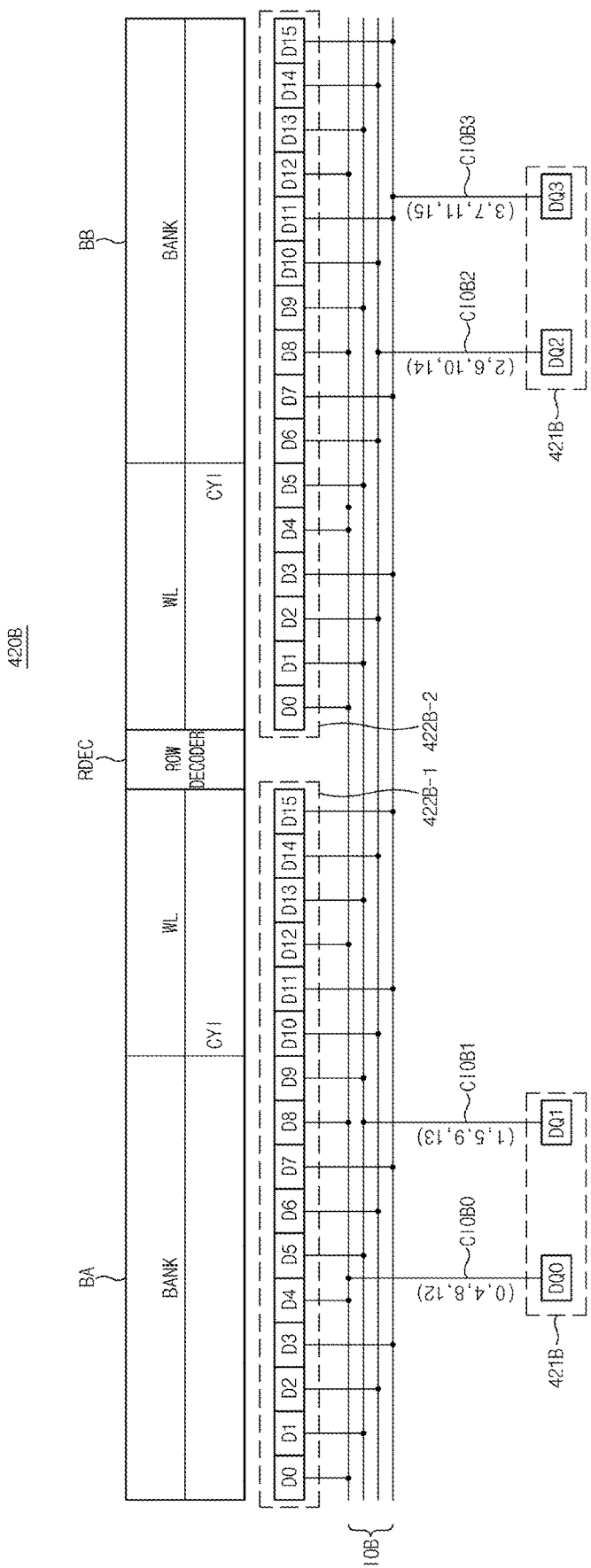
FIG. 16 illustrates a memory core shown in FIG. 13 according to another embodiment of the present disclosure.

FIG. 16 illustrates another example of the memory core 420 shown in FIG. 12 according to an embodiment of the present disclosure.

Referring to FIG. 16, a memory core 420B may include data I/O circuit 421B, data drivers 422B-1 and 422B-2, a row decoder RDEC, and banks BA and BB.

The embodiment of FIG. 16 will hereinafter be described focusing upon a write operation of data for convenience of description. Data, which has been read from a reference memory device, for example, the memory device M1_1 shown in FIG. 12, may be stored in a target memory device, for example, the memory device M2_1 shown in FIG. 12. In this embodiment, the data read from the memory device M1_1 is stored in the memory core 420B.

In addition, the embodiment of FIG. 16 discloses an illustrative case in which the control signal CON from the controller 400 shown in FIG. 12 is set to the compression mode. In the compression mode, the memory core 420B may receive data of the data bus DB2 through the interface 410 shown in FIG. 12, and may store the received data in the banks BA and BB. The embodiment of FIG. 16 discloses that the received data is stored in both of the banks BA and BB for convenience of description.

For example, it is assumed that data received through the data bus DB1 is denoted by (×12) and data received through the data bus DB2 is denoted by (×4). In the compression mode, the interface 410 may transmit the data denoted by (×4) and received through the data bus DB2 to the memory core 420B.

The data I/O circuit 421B may receive four data DQ0~DQ3 from the interface 410 at a time, and may transmit the received data DQ0~DQ3 to common I/O buses CIOB0~CIOB3. The data DQ0~DQ3 applied to the common I/O buses CIOB0~CIOB3 may be copied through an internal I/O bus IOB, such that data D0~D15 corresponding to the data DQ0~DQ3 may be transmitted not only to the bank BA but also to the bank BB.

For example, the data DQ0 applied to the common I/O bus CIOB0 may be copied into several data D0, D4, D8, and D12 through the internal I/O bus IOB. The data DQ1 applied to the common I/O bus CIOB1 may be copied into several data D1, D5, D9, and D13 through the internal I/O bus IOB. The data DQ2 applied to the common I/O bus CIOB2 may be copied into several data D2, D6, D10, and D14 through the internal I/O bus IOB. In addition, the data DQ3 applied to the common I/O bus CIOB3 may be copied into several data D3, D7, D11, and D15 through the internal I/O bus IOB.

Therefore, the 16 data D0~D15 may be applied to the bank BA through the internal I/O bus IOB. Similarly, the 16 data D0~D15 may be applied to the bank BB through the internal I/O bus IOB. Each of the data drivers 422B-1 and 422B-2 may drive the data D0~D15 received through the internal I/O bus IOB, and may transmit the data D0~D15 to a corresponding one of the banks BA and BB.

In the bank BA, a word line WL may be selected by the row decoder RDEC, and a column line may be selected by a column selection signal CYI, such that the data D0~D15 may be stored in corresponding cells of the bank BA. Similarly, in the bank BB, a word line WL may be selected by the row decoder RDEC, and a column line may be selected by a column selection signal CYI, such that the data D0~D15 may be stored in corresponding cells of the bank BB. In this case, the bank BA and the bank BB may be simultaneously accessed such that the write operation of the data D0~D15 can be carried out at the same time in the banks BA and BB.

Figure 17:
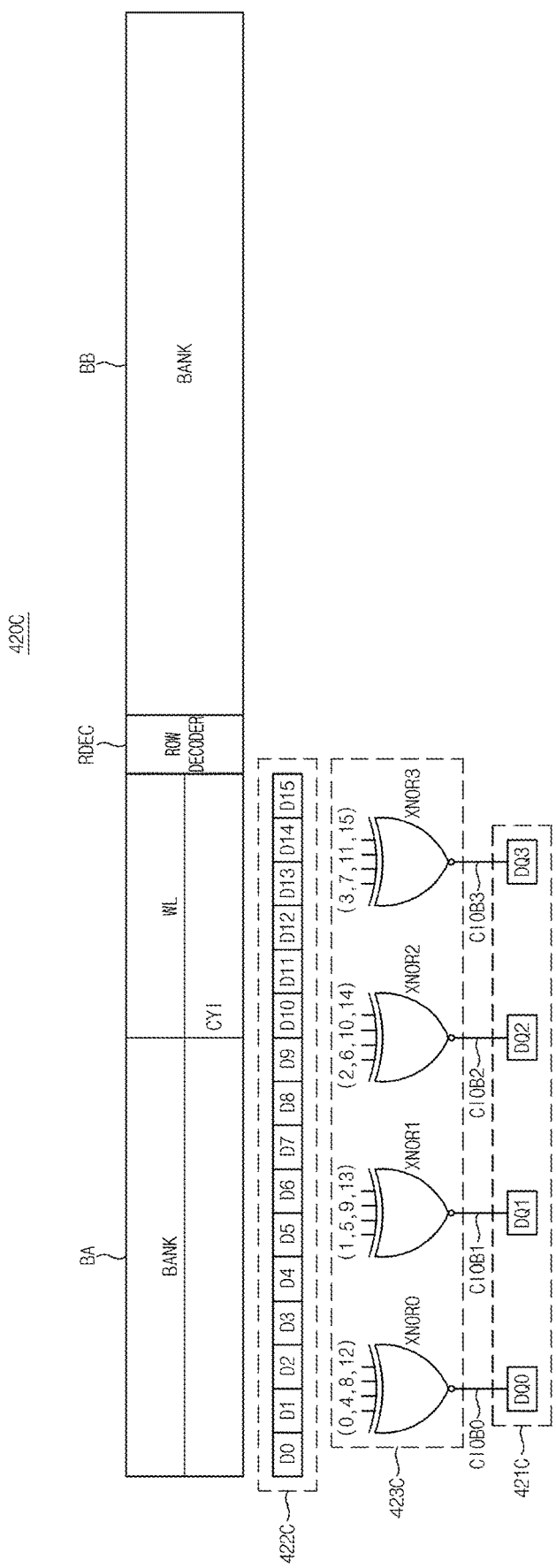
FIG. 17 illustrates a memory core shown in FIG. 13 according to another embodiment of the present disclosure.

FIG. 17 illustrates another example of the memory core 420 shown in FIG. 13 according to an embodiment of the present disclosure.

Referring to FIG. 17, a memory core 420C may include a data I/O circuit 421C, a data driver 422C, a data compression circuit 423C, a row decoder RDEC, and banks BA and BB.

The embodiment of FIG. 17 will hereinafter be described focusing upon a read operation of data for convenience of description. The embodiment of FIG. 17 discloses an illustrative case in which the control signal CON from the controller 400 shown in FIG. 12 is set to the compression mode.

The memory core 420C may compress data read from the bank BA, and may transmit the compressed data to the data bus DB2 through the interface 410 shown in FIG. 12. The embodiment of FIG. 17 discloses that data is read from the bank BA from among the banks BA and BB. However, the scope or spirit of the present disclosure is not limited thereto, and data stored in the bank BB from among the banks BA and BB may be read or data stored in the banks BA and BB may be read, as necessary.

For example, in the compression mode, data denoted by (×16), which is read from the bank BA, may be compressed, such that the compressed data may be output to the interface 410. It is assumed that data applied to the data bus DB1 is denoted by (×12) and data applied to the data bus DB2 is denoted by (×4). As a result, the interface 410 may transmit the compressed data denoted by (×4) to the data bus DB2.

In the bank BA, a word line WL may be selected by the row decoder RDEC, and a column line may be selected by a column selection signal CYI, such that data D0~D15 stored in corresponding cells of the bank BA may be output to the data driver 422C. In this case, the 16 data D0~D15 may be output from the bank BA.

The data D0~D15 output from the data driver 422C may be applied to the data compression circuit 423C. The data compression circuit 423C may compress the output data D0~D15, and may output the compressed data to common I/O buses CIOB0~CIOB3. In this case, the data compression circuit 423C may include a plurality of exclusive-NOR (XNOR) gates XNOR0~XNOR3 respectively coupled to the common I/O buses CIOB0~CIOB3.

The XNOR gate XNOR0 may perform an XNOR operation on the data D0, D4, D8, and D12 selected from among the 16 data D0~D15, and may output the XNOR operation result of the selected data D0, D4, D8, and D12 to the common I/O bus CIOB0. The XNOR gate XNOR1 may perform an XNOR operation on the data D1, D5, D9, and D13 selected from among the 16 data D0~D15, and may output the XNOR operation result of the selected data D1, D5, D9, and D13 to the common I/O bus CIOB1. The XNOR gate XNOR2 may perform an XNOR operation on the data D2, D6, D10, and D14 selected from among the 16 data D0~D15, and may output the XNOR operation result of the selected data D2, D6, D10, and D14 to the common I/O bus CIOB2. The XNOR gate XNOR3 may perform an XNOR operation on the data D3, D7, D11, and D15 selected from among the 16 data D0~D15, and may output the XNOR operation result of the selected data D3, D7, D11, and D15 to the common I/O bus CIOB3.

The data I/O circuit 421C may transmit, as four data DQ0~DQ3, the XNOR operations results received through the common I/O buses CIOB0~CIOB3 to the data bus DB2.

Figure 18:
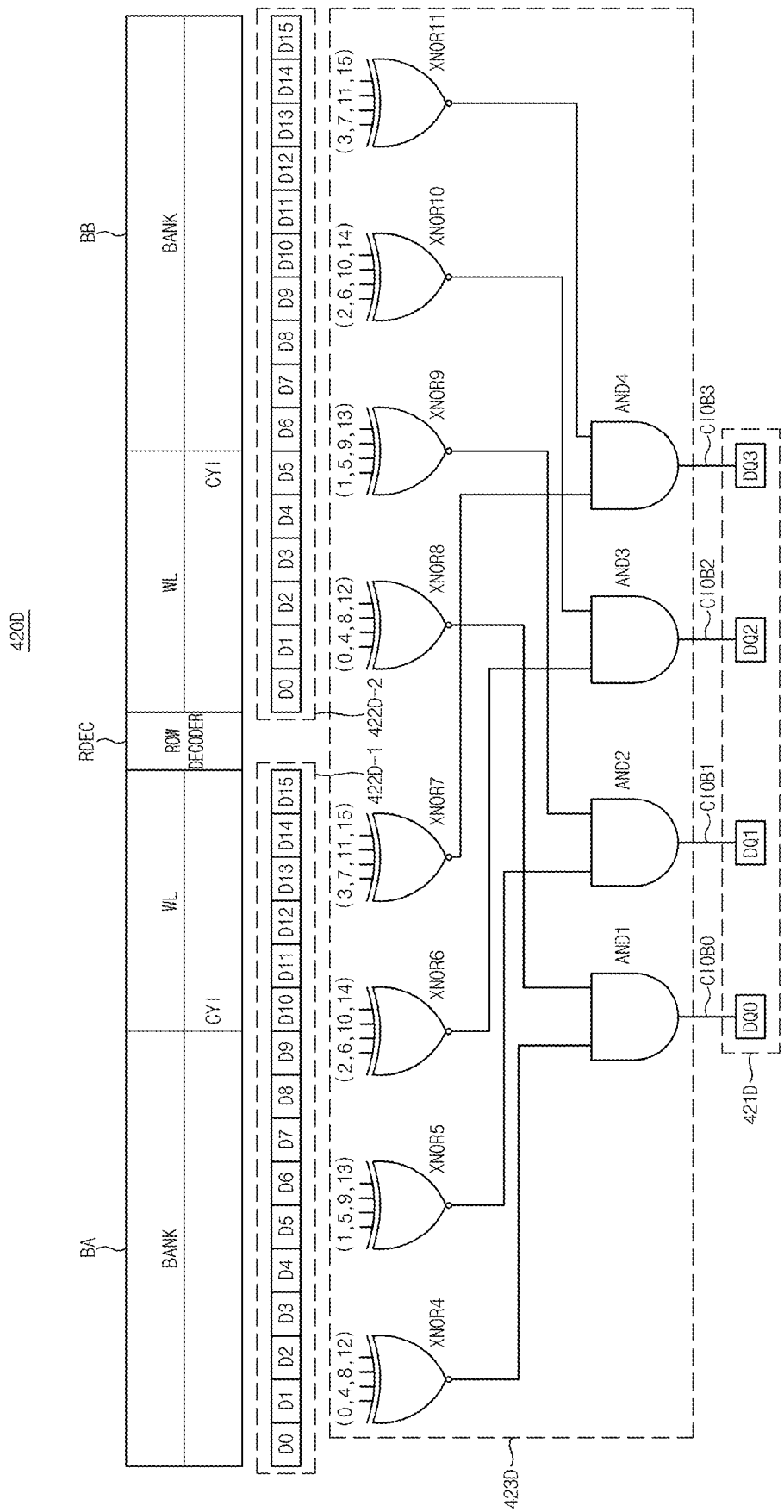
FIG. 18 illustrates a memory core shown in FIG. 13 according to another embodiment of the present disclosure.

FIG. 18 illustrates another example of the memory core 420 shown in FIG. 13 according to an embodiment of the present disclosure.

Referring to FIG. 18, a memory core 420D may include a data I/O circuit 421D, data drivers 422D-1 and 422D-2, a data compression circuit 423D, a row decoder RDEC, and banks BA and BB.

The embodiment of FIG. 18 will hereinafter be described focusing upon a read operation of data for convenience of description. In addition, the embodiment of FIG. 18 discloses an illustrative case in which the control signal CON from the controller 400 shown in FIG. 12 is set to the compression mode.

The memory core 420D may compress data read from the banks BA and BB, and may transmit the compressed data to the data bus DB2 through the interface 410 shown in FIG. 12. The embodiment of FIG. 18 discloses that data is read from the banks BA and BB.

For example, in the compression mode, a sum of data denoted by (×16) read from the first bank BA and data denoted by (×16) read from the second bank BB is acquired, and the sum of data, i.e., data denoted by (×32), may be output to the data compression circuit 423D. For example, it is assumed that data applied to the data bus DB1 is denoted by (×12) and data applied to the data bus DB2 is denoted by (×4). As a result, the data compression circuit 423D may compress the data denoted by (×32) to thereby generate compressed data denoted by (×4), and may transmit the compressed data denoted by (×4) to the data bus DB2 through the interface 410.

In the bank BA, a word line WL may be selected by the row decoder RDEC, and a column line may be selected by a column selection signal CYI, such that data D0~D15 stored in corresponding cells of the bank BA may be output to the data driver 422D-1. In this case, the first 16 data D0~D15 may be output from the bank BA to the data driver 422D-1.

In the bank BB, a word line WL may be selected by the row decoder RDEC, and a column line may be selected by a column selection signal CYI, such that data D0~D15 stored in corresponding cells of the bank BB may be output to the data driver 422D-2. In this case, the second 16 data D0~D15 may be output from the bank BB to the data driver 422D-2.

The data D0~D15 read from each of the banks BA and BB may be driven by each of the data drivers 422D-1 and 422D-2, such that the data D0~D15 from each of the data drivers 422D-1 and 422D-2 may be applied to the data compression circuit 423D. The data compression circuit 423D may compress the data D0~D15 read from each of the banks BA and BB, and may output the compressed data to common I/O buses CIOB0~CIOB3.

The data compression circuit 423D may include a plurality of XNOR gates XNOR4~XNOR11 and a plurality of AND gates AND1~AND4. The XNOR gate XNOR4 may perform an XNOR operation on the data D0, D4, D8, and D12 selected from among the first data D0~D15 read from the bank BA, and may output the XNOR operation result of the selected data D0, D4, D8, and D12 to the AND gate AND1. The XNOR gate XNOR5 may perform an XNOR operation on the data D1, D5, D9, and D13 selected from among the first data D0~D15 read from the bank BA, and may output the XNOR operation result of the selected data D1, D5, D9, and D13 to the AND gate AND2. The XNOR gate XNOR6 may perform an XNOR operation on the data D2, D6, D10, and D14 selected from among the first data D0~D15 read from the bank BA, and may output the XNOR operation result of the selected data D2, D6, D10, and D14 to the AND gate AND3. The XNOR gate XNOR7 may perform an XNOR operation on the data D3, D7, D11, and D15 selected from among the first data D0~D15 read from the bank BA, and may output the XNOR operation result of the selected data D3, D7, D11, and D15 to the AND gate AND4.

The XNOR gate XNOR8 may perform an XNOR operation on the data D0, D4, D8, and D12 selected from among the second data D0~D15 read from the bank BB, and may output the XNOR operation result of the selected data D0, D4, D8, and D12 to the AND gate AND1. The XNOR gate XNOR9 may perform an XNOR on the data D1, D5, D9, and D13 selected from among the second data D0~D15 read from the bank BB, and may output the XNOR operation result of the selected data D1, D5, D9, and D13 to the AND gate AND2. The XNOR gate XNOR10 may perform an XNOR operation on the data D2, D6, D10, and D14 selected from among the second data D0~D15 read from the bank BB, and may output the XNOR operation result of the selected data D2, D6, D10, and D14 to the AND gate AND3. The XNOR gate XNOR11 may perform an XNOR operation on the data D3, D7, D11, and D15 selected from among the second data D0~D15 read from the bank BB, and may output the XNOR operation result of the selected data D3, D7, D11, and D15 to the AND gate AND4.

The AND gate AND1 may perform an AND operation on output signals of the XNOR gates XNOR4 and XNOR8, and may output the AND operation result to the common I/O bus CIOB0. The AND gate AND2 may perform an AND operation on output signals of the XNOR gates XNOR5 and XNOR9, and may output the AND operation result to the common I/O bus CIOB1. The AND gate AND3 may perform an AND operation on output signals of the XNOR gates XNOR6 and XNOR10, and may output the AND operation result to the common I/O bus CIOB2. The AND gate AND4 may perform an AND operation on output signals of the XNOR gates XNOR7 and XNOR11, and may output the AND operation result to the common I/O bus CIOB3.

The data output circuit 421D may receive the compressed data from the common I/O buses CIOB0~CIOB3, and may output, as four data DQ0~DQ3, the compressed data to the data bus DB2 through the interface 410.

As described above, the embodiment of the present disclosure may compress the first and second data D0~D15 read from the banks BA and BB instead of outputting all the first and second data D0~D15, such that data less than all the first and second data D0~D15 can be output. Therefore, in this case, during data transmission, a data loading time can be reduced and a data transfer rate can be increased, resulting in reduction in power consumption.

Figure 19:
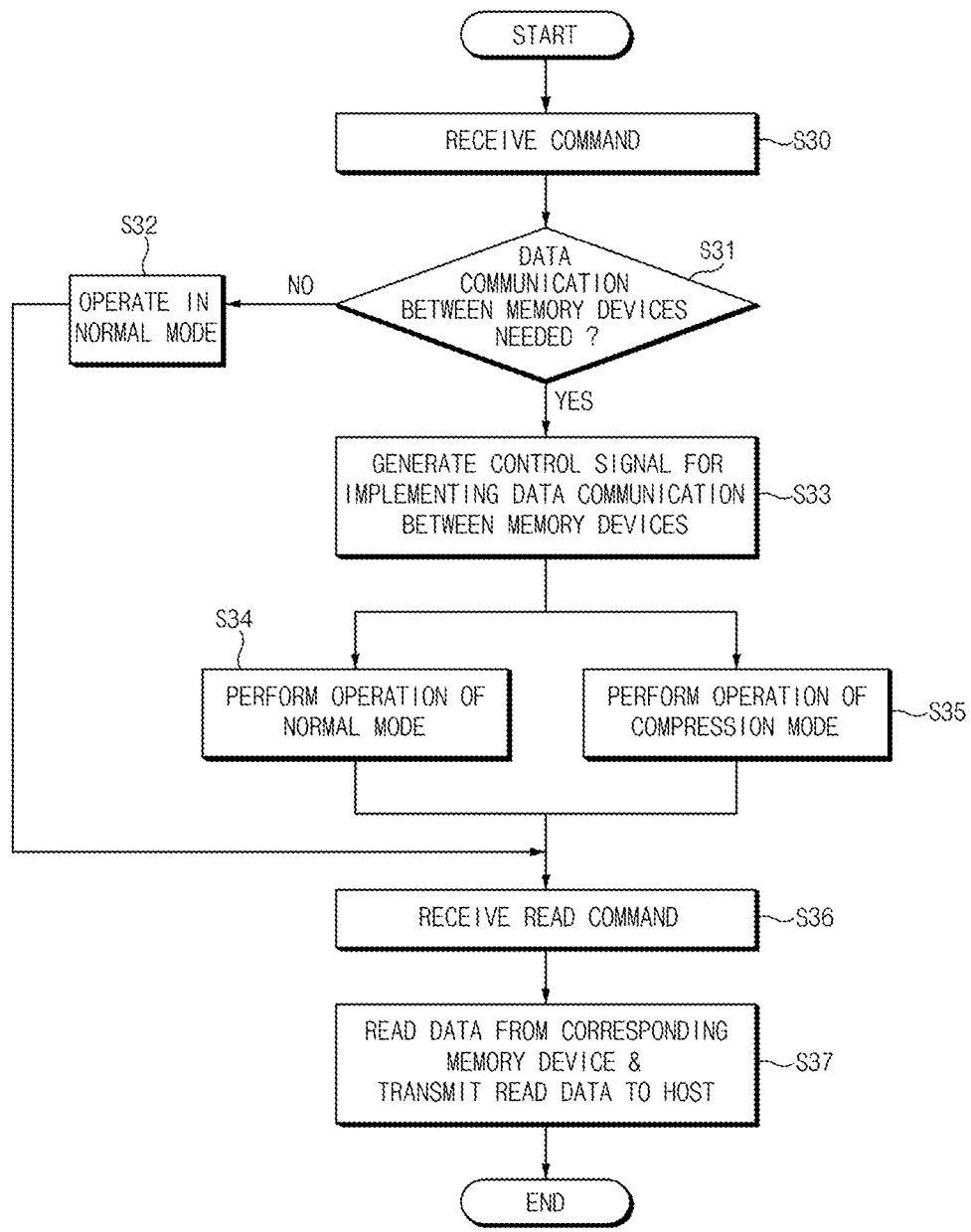
FIG. 19 is a flowchart illustrating operations of a memory system according to an embodiment of the present disclosure.

FIG. 19 is a flowchart illustrating operations of a memory system according to an embodiment of the present disclosure. The operations of FIG. 19 will be described with reference to FIGS. 11 and 12.

Referring to FIG. 19, the memory controller 100_1 may receive a command from the host (Step S30). The memory controller 100_1 may analyze the command received from the host, and may determine whether an operation for directly transmitting data between the memory devices M1_1~M4_1 is needed (Step S31). For example, if power consumption needs to be reduced, if an operation speed of each memory device needs to be increased, or if reliability of each memory device needs to be improved, the memory controller 100_1 may determine that data transmission among the memory devices M1_1~M4_1 is needed.

If the data transmission among the memory devices M1_1~M4_1 needs not be carried out, each of the memory devices M1_1~M4_1 may operate in a normal mode (Step S32). On the other hand, when the memory controller 100_1 receives a command for implementing the data transmission among the memory devices M1_1~M4_1, the memory controller 100_1 may generate the memory control signal MCON corresponding to the data transmission based on the received command (Step S33).

Upon receiving a write command or a read command from the host, the memory controller 100_1 may transmit the memory control signal MCON for executing the write command or the read command to a controller of each of the memory devices M1_1~M4_1. In response to the memory control signal MCON, the controller of each of the memory devices M1_1~M4_1 may determine whether a current mode is a normal mode for transmitting the entire data transmitted through the data buses DB1 and DB2 to the corresponding one of the memory devices M1_1~M4_1 or is a compression mode for transmitting some of the entire data to the corresponding one of the memory devices M1_1~M4_1.

If the current mode is the normal mode for transmitting the entire data, each of the memory devices M1_1~M4_1 may operate in the normal mode (Step S34). On the other hand, if the current mode is the compression mode, the controller of each of the memory devices M1_1~M4_1 may generate the control signal CON for transmitting data transmitted through the data bus DB2 to the memory core of the corresponding memory device. Each of the memory devices M1_1~M4_1 may operate in the compression mode in response to the control signal CON (Step S35).

In this case, a reference memory device and a target memory device may operate independently from each other. For example, when the reference memory device, for example, the memory device M1_1, is processing the entire data transmitted through the data buses DB1 and DB2 during the normal mode, the target memory device, for example, the memory device M2_1, may copy some of the entire data, which is transmitted through the data bus DB2, in the compression mode. In some embodiments, the operation of accessing the reference memory device and the operation of accessing the target memory device may be carried out simultaneously or successively.

In an embodiment, when the operation of accessing the reference memory device and the operation of accessing the target memory device may be carried out successively, data, which has been read from the reference memory device, may be transmitted to the target memory device through the data bus DB2. Accordingly, the target memory device may store the data read from the reference memory device.

Thereafter, when the memory controller 100_1 receives a read command from the host (Step S36), the memory controller 100_1 may transmit data read from a corresponding memory device from among the memory devices M1_1~M4_1 to the host (Step S37).

As is apparent from the above description, the memory system according to the embodiments of the present disclosure may increase a data transfer rate while simultaneously reducing power consumption.

As data or the amount of data processed by a data center application increases in size, the number of hardware resources required for the data center application also increases. Server architecture has recently evolved to more efficiently employ such hardware resources.

For example, deep learning applications and also a large number of machine learning applications may be executed in a cloud data center. Most of the deep learning applications and the machine learning applications have low temporal locality, such that it is preferable that the deep learning applications and the machine learning applications be arithmetically processed (i.e., computed) using a hardware accelerator (for example, a Graphics Processing Unit (GPU), a Field Programmable Gate Array (FPGA), etc.), instead of a Central Processing Unit (CPU).

In this case, the term "temporal locality" may refer to the degree to which an operation that accesses data once (i.e., once-accessed data or initially-accessed data) is likely to access that data again within a relatively short period of time after completion of the initial access to the data. That is, the above-mentioned applications may predominantly use cold data that has not been accessed for a while, rather than using hot data that is frequently accessed. As a result, the above-mentioned applications may not benefit from the cache memory systems typically employed in CPUs to reduce the effect of the relatively low bandwidth and high latency characteristic of some large memory systems.

An operation process for allowing a processor (e.g., CPU) to perform off-loading of a job to the accelerator will hereinafter be described below. In some cases, data may initially be moved from a local memory of the processor to a local memory of the accelerator. Thereafter, when the accelerator finishes arithmetic processing or computation, the computation result should be transferred to the processor.

However, when the costs (such as delay or power consumption) of such data movement are higher than costs needed for data computation, it is preferable in terms of cost efficiency that an architecture be implemented in which less data needs to be transferred to perform the desired computation. To this end, a memory-driven computing concept has been proposed.

Figure 20:
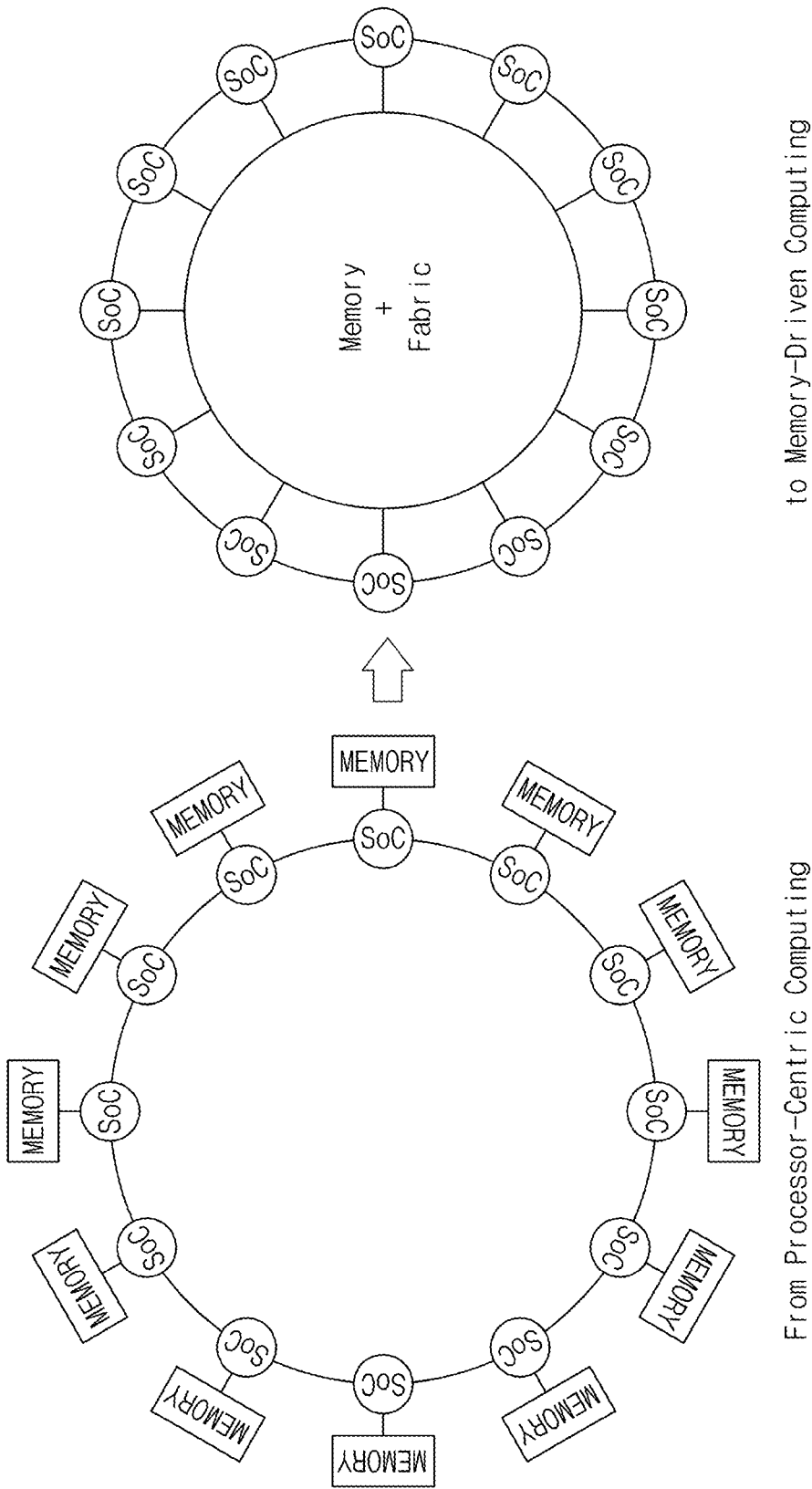
FIG. 20 is a conceptual diagram illustrating a memory system according to an embodiment of the present disclosure.

FIG. 20 is a conceptual diagram illustrating an example of a memory system according to an embodiment of the present disclosure.

FIG. 20 illustrates a memory-based computing structure for memory driven computing, and how it differs from a System on Chip (SoC)-based (i.e., processor-based) computing structure (i.e., a computing device) for processor-centric computing. In the processor-based computing structure, a single SoC may be coupled to a single memory on a one to one basis.

Memory-driven computing may use a unified memory in which multiple SoCs are coupled to one another through a fabric network. Data communication between the SoCs may be achieved through a memory system bandwidth.

In addition, one unified memory to which multiple SoCs are coupled through the fabric network need not perform typical memory copying to implement data communication between the SoCs. In order to implement commercially available memory-driven computing, a high bandwidth, low latency, coherency, etc. should be supported.

In association with technical fields of the above-mentioned embodiment of the present disclosure, many developers and companies are conducting intensive research into technology for interconnecting transaction-based memory systems.

In association with accelerator technology, various research, for example, Near Data Processing (NDP) or Processing In Memory (PIM), into where to position the accelerator based on workload characteristics has been intensively studied and proposed. In this case, Processing In Memory (PIM) may refer to a memory in which computation logic is closely coupled to memory cells so as to increase a data processing rate and a data transfer rate.

The embodiment of the present disclosure relates to technology of a pooled memory architecture in which multiple memories are combined, and an in-memory database usage appropriate for the pooled memory architecture. The following description will disclose characteristics of a map-reduce application and a method for processing map computation using an accelerator (to be described later) embedded in the pooled memory.

Figure 21:
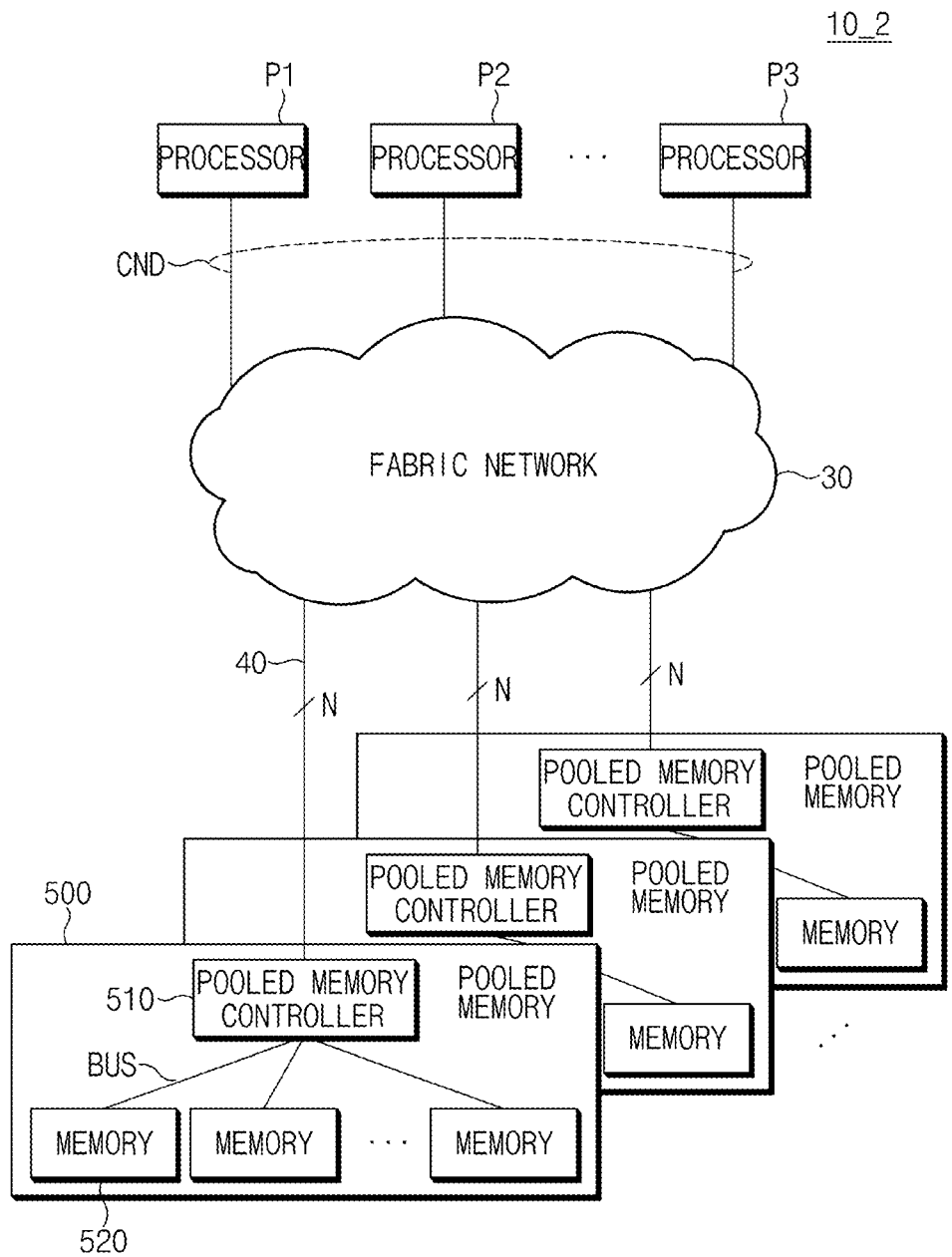
FIG. 21 is a conceptual diagram illustrating a memory system according to an embodiment of the present disclosure.

FIG. 21 is a conceptual diagram illustrating the memory system 10_2 according to an embodiment of the present disclosure.

The memory system 10_2 may be based on the above-mentioned memory-driven computing architecture. The memory system 10_2 may include a plurality of processors (e.g., CPUs) P1, P2, and P3, a fabric network 30, a plurality of channels 40, and a plurality of pooled memories (or pooled memory devices) 500. The term "the memory system" is not limited the configuration illustrated in FIG. 21. For example, the memory system may also refer to a system that includes a pooled memory controller and a plurality of memories, where the memory system is coupled to a plurality of processors via a fabric network.

The plurality of processors P1~P3 may be coupled to the fabric network 30 through a node CND (or one or more nodes). The plurality of processors P1~P3 may be coupled to the plurality of pooled memories through the fabric network 30. In an embodiment, one or more of the pooled memory 500 may be coupled to the fabric network 30 through the plurality of channels 40. For example, each of the pooled memories 500 may be coupled to the fabric network 30 through N channels 40, where N is greater than or equal to 1. While FIG. 21 illustrates a single node CND coupling a plurality of processors P1~P3 to the fabric network 30, embodiments are not limited thereto, and in an embodiment, a plurality of nodes may each couple respective pluralities of processors to the fabric network 30. For example, each of the SoCs shown in the Memory-Driven Computing system of FIG. 20 may include a node coupling a plurality of processors to the fabric.

Each of the pooled memories 500 may include a plurality of memories (or memory devices) 520 and a pooled memory controller (PMC) 510 to control the plurality of memories 520. The pooled memory controller (PMC) 510 may be coupled to each memory 520 through a bus (BUS).

Each memory 520 may be directly coupled to the fabric network 30. However, the scope or spirit of the present disclosure is not limited thereto, and the plurality of memories 520 may be provided within a single pooled memory 500, such that the pooled memory 500 directly couples to the fabric network 30, and the plurality of memories 520 indirectly couple to the fabric network 30 through an interface (e.g., the pooled memory controller 510) of the pooled memory 500.

When the pooled memory 100 includes a plurality of memories 520, the pooled memory controller (PMC) 510 may be located between the fabric network 30 and the plurality of memories 520 such that the pooled memory controller (PMC) 510 can manage the respective memories 520. That is, communications between the plurality of memories 520 and the fabric network 30 may be provided by (and, in embodiments, managed by) the pooled memory controller (PMC) 510.

In an embodiment, the pooled memory controller (PMC) 510 may perform memory interleaving to increase throughput, or may support address remapping to increase reliability, availability, serviceability, and so on.

In-memory database may refer to a database management system for storing necessary data in a main memory but not a storage device (e.g., a storage device such as a hard disk drive (HDD) or solid-state drive (SSD)), such that the in-memory database can be rapidly accessed.

A server system of the related arts may have physical difficulty increasing memory storage capacity beyond a predetermined memory capacity. In such a server system, an application cannot allow the size of a database (DB) to be larger than a predefined memory capacity of each server. If the database (DB) is increased in size, data to be stored in the database (DB) should be stored in a plurality of servers in a distributed manner, which may result in system performance being unavoidably degraded by the interconnection process of the plurality of servers. To avoid this, the pooled memory 500 may provide a higher storage capacity and/or a higher bandwidth than the server systems of the related arts, such that the pooled memory 500 can more efficiently support the In-Memory DB than the server systems of the related arts.

Figure 22:
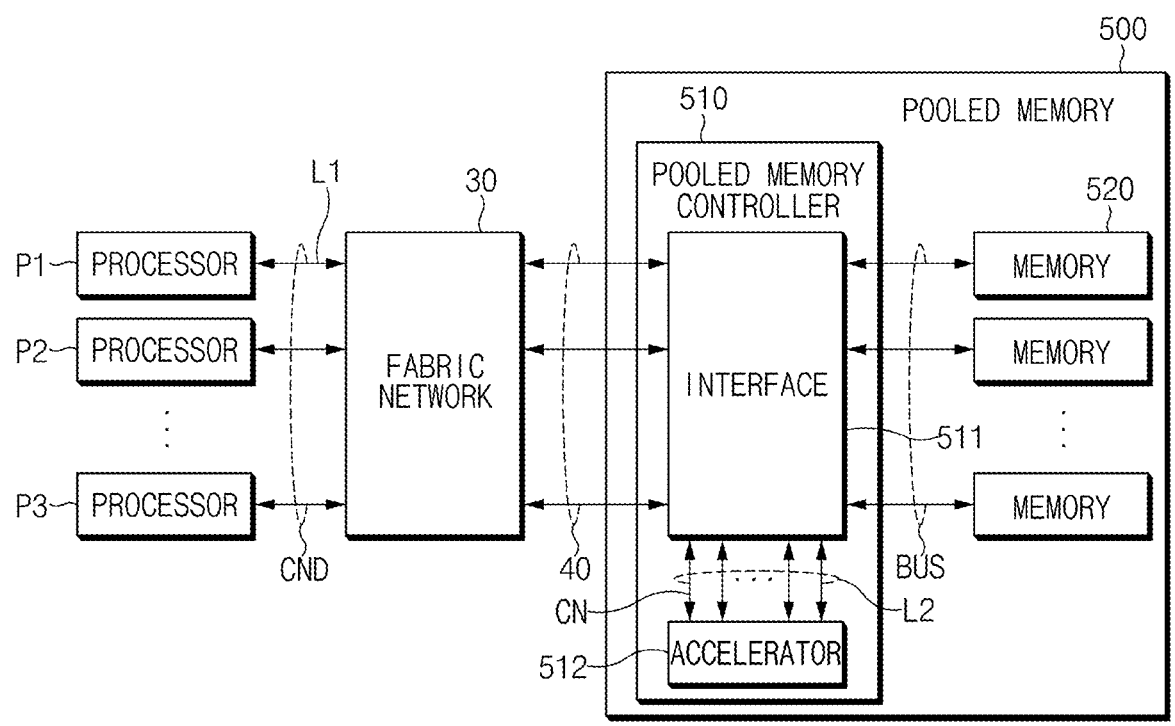
FIG. 22 is a block diagram illustrating a pooled memory controller according to an embodiment of the present disclosure.

FIG. 22 is a block diagram illustrating the pooled memory controller (PMC) 510 shown in FIG. 21 according to an embodiment of the present disclosure.

The pooled memory controller (PMC) 510 may include an interface 511 and an accelerator 512. In this case, the interface 511 may perform packet relay among the fabric network 30, the accelerator 512, and the plurality of memories 520. The interface 511 may be coupled to the accelerator 512 through the plurality of accelerator channels (CN).

The interface 511 according to this embodiment may include a switch to perform such packet relay. This switch may be located among the fabric network 30, the accelerator 512, and the memories 520. Although the embodiment of the present disclosure has illustratively disclosed that the interface 511 includes the switch for more convenient understanding of the present disclosure, the scope or spirit of the present disclosure is not limited thereto, and it should be noted that other technical means needed for such packet relay may also be applied to the present disclosure without difficulty.

The accelerator 512 may perform computation on data received through the interface 511. For example, the accelerator 512 may perform a map computation of data received from one or more memory 520 through the interface 511, and may store the data that results from the map computation (i.e., the resultant data) in one or more memory 520 through the interface 511. In an embodiment, the accelerator 512 is programmable, that is, the accelerator 512 performs the map computation by executing computer programming instructions provided to the accelerator 512 from a non-transitory computer-readable medium.

The above-mentioned embodiment illustratively discloses one accelerator 512 in the pooled memory controller (PMC) 510 for convenience of description. However, the scope or spirit of the present disclosure is not limited thereto, and it should be noted that a plurality of accelerators 512 may also be included in the pooled memory controller (PMC) 510.

Map-reduce application may refer to a software framework designed to process high-capacity data using distributed parallel computing. This map-reduce application has been used in various kinds of applications. Map computation for use in the map-reduce application may be configured in a manner that, after intermediate information is extracted in the form of Key and Value (Key, Value), reduce computation may collect the extracted intermediate information and then output a desired final result based on the collected information. Typically, "map" refers to an operation that selects and/or sorts data from a database (such as an in-memory database), and "reduce" refers to an operation that performs a computation using the selected and sorted data produced by the map operation as inputs.

For example, assuming that a user of the memory system 10_2 desires to search for information about "the highest temperature on Earth every year" using the map-reduce application, a map computation may extract year and temperature information by reading information (or "read information") in a text file, and may output a list comprised of pairs of year and temperature (Year, Temperature). The list may include multiple (Year, Temperature) pairs for each year. A reduce application may collect the above-mentioned map computation result, may arrange the collected information in ascending or descending numerical order of temperature values, and may output the (Year, Temperature) pairs having a highest temperature for each year to produce the desired final result. In this case, the noteworthy characteristics are characterized in that data to be used for such map computation is generally high-capacity data and resultant data produced by the map computation is relatively-smaller-sized data (i.e., relatively-smaller-capacity data).

Whereas the memory system 10_2 according to the embodiment is designed to process high-capacity data as in map computation of the map-reduce application, the memory system 10_2 may also perform off-loading of low-reuse-rate computation using the accelerator 512 of the pooled memory controller (PMC) 510. In this case, the term "off-loading" may refer to a series of processes in which a request is received from each of the processors P1~P3, necessary data is analyzed in response to the received request, necessary computation corresponding to the analyzed data is performed, and the computation result is finally output. In the case of processing data within the pooled memory 500, energy consumption needed to transfer data to the node CND of the processors P1~P3 can be reduced and system performance can also be increased.

The accelerator 512 may be provided in the pooled memory controller (PMC) 510, or may be provided in each memory 520. From the viewpoint of near data processing, a method for processing near data using accelerators within each memory 520 may be more efficient than a method for processing near data using an accelerator within the pooled memory controller (PMC) 510.

In order to provide a high bandwidth, the pooled memory controller (PMC) 510 may perform memory interleaving. In this case, data may be stored in multiple memories 520 in a distributed manner. As a result, data needed for the accelerator 512 may also be stored in multiple memories 520 in the same distributed manner. The following embodiment will disclose an illustrative case in which the physical position of the accelerator 512 is arranged in the pooled memory controller (PMC) 510 for convenience of description, but embodiments are not limited thereto.

Information regarding the performance and energy efficiency benefits of the above-mentioned method for performing off-loading of a map computation of the map-reduce application using the accelerator 512 in the memory will hereinafter be described with reference to the attached drawings.

Assuming that computation to be performed by the accelerator 512 has computational complexity similar to the map computation of the map-reduce application, a computation time needed for the accelerator 512 may be dependent upon a bandwidth through which data is read from the corresponding memory. Therefore, the range of a bandwidth of the accelerator 512 may be increased, so that a computation time of the accelerator 512 can be reduced.

As illustrated in FIG. 22, the nodes (CND) of a series of processors P1~P3 may be coupled to the pooled memory 500 through the fabric network 30. For convenience of description and better understanding of the present disclosure, it is assumed that each node CND includes a single link L1 for each processor P1~P3, and the accelerator 512 provided in the pooled memory controller (PMC) 510 includes four links (L2). That is, a bandwidth of the links L2 of the accelerator 512 may be larger than that of the link L1 of each processor P1~P3. As a result, when off-loading of a map computation or a similar computation is performed using the accelerator 512, a processing speed of off-loading of map computation may advantageously be, in this example, four times faster than that of the method for processing such off-loading through each processor P1~P3.

When both map computation and reduce computation are carried out by each of the processors P1~P3, it is assumed for purpose of illustration that a time consumed for the map computation occupies 99% of a total execution time. In addition, when multiple applications are carried out by only one processor P1~P3, an execution time consumed by the map-reduce application may occupy about 10% of a total execution time of all applications. When off-loading of the map computation is performed using the accelerator 512, a map computation time is reduced by about ¼, such that total system performance may be improved by about 81%.

Figure 23:
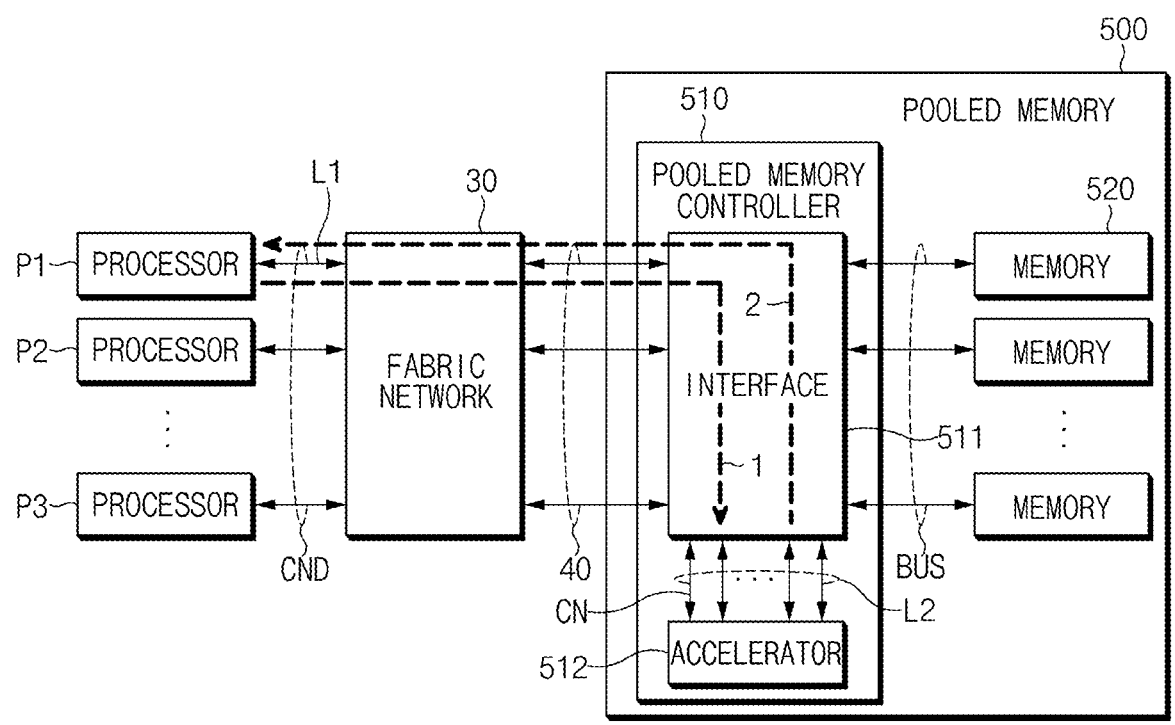
FIGS. 23, 24, and 25 illustrate operations of a memory system according to an embodiment of the present disclosure.
Figure 24:
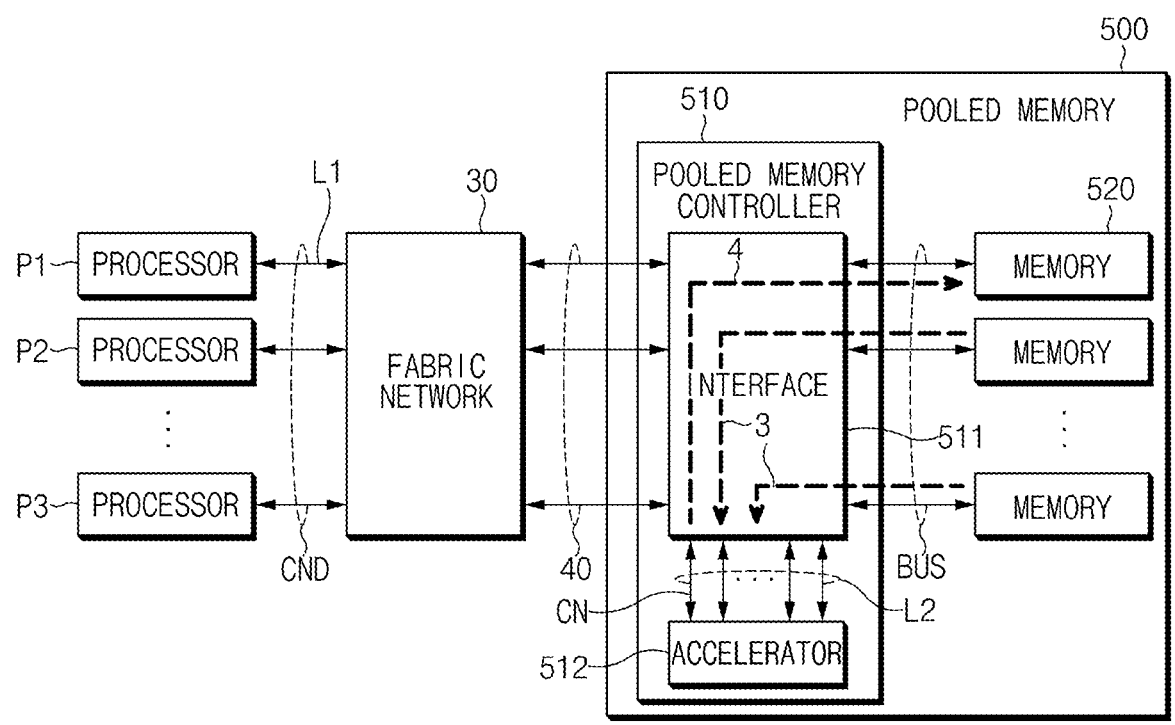
Figure 25:
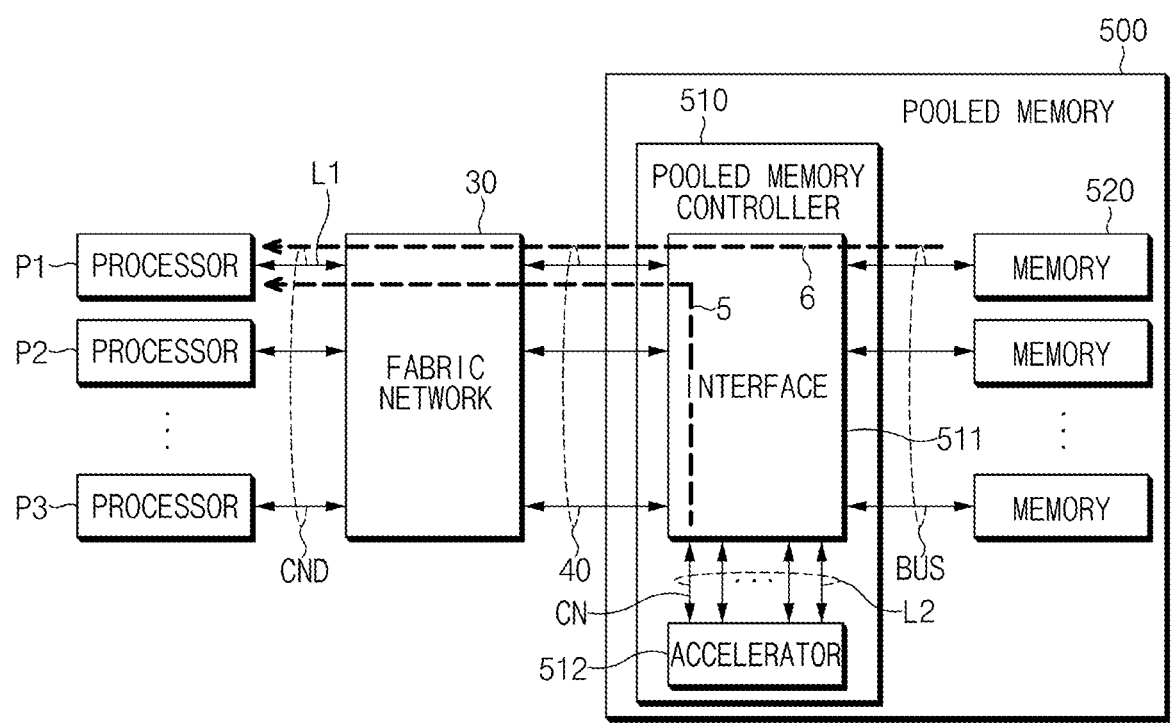

FIGS. 23, 24, and 25 are conceptual diagrams illustrating operations of the memory system 10_2 according to an embodiment of the present disclosure.

First of all, as illustrated by path 1 of FIG. 23, each of the processors P1~P3 may transmit a packet requesting a map computation to the pooled memory 500. That is, the map computation request packet received from the processors P1~P3 may be transmitted to the accelerator 512 after passing through the fabric network 30 and the interface 511 of the pooled memory controller (PMC) 510. The map computation request packet may include information about an address in which input data to be used for map computation is stored, information about the size of data, information about an address to be used for storing the map computation resultant data, and the like.

Subsequently, as illustrated by path 2 of FIG. 23, the pooled memory controller (PMC) 510 may transmit a map computation response packet to the processors P1~P3 through the fabric network 30. That is, the pooled memory controller (PMC) 510 may transmit to the processor P1~P3 a specific signal indicating that the accelerator 512 has properly received the map computation request packet.

Thereafter, as illustrated by path 3 shown in FIG. 24, the pooled memory controller (PMC) 510 may read input data needed for map computation from one or more memories (or each of the memories) 520, and may transmit the read input data to the accelerator 512. The input data required by the accelerator 512 may be distributed among the plurality of memories 520 and stored in the memories 520 in a distributed manner. In this case, the accelerator 512 may read input data from more than one of the plurality of memories 520 and may perform the map computation based on the input data read from the memories 520.

Subsequently, as illustrated by path 4 shown in FIG. 24, the pooled memory controller 510 may read the map computation resultant data produced by the accelerator 512, may transmit the read resultant data to each memory 520, and may store the transmitted resultant data in each memory 520. The map computation resultant data computed by the accelerator 512 may be distributed to the plurality of memories 520 and stored in the memories 520 in a distributed manner.

Thereafter, as illustrated by path 5 (see FIG. 25), the pooled memory controller (PMC) 510 may transmit through the fabric network 30 an interrupt packet or other signal to the processors P1~P3 to indicate that the map computation performed by the accelerator 512 has been completed.

Then, as illustrated by path 6 (see FIG. 25), the pooled memory controller (PMC) 510 may read the resultant data stored in the memories 520, and may transmit the read resultant data to the processors P1~P3 through the fabric network 30.

Figure 26:
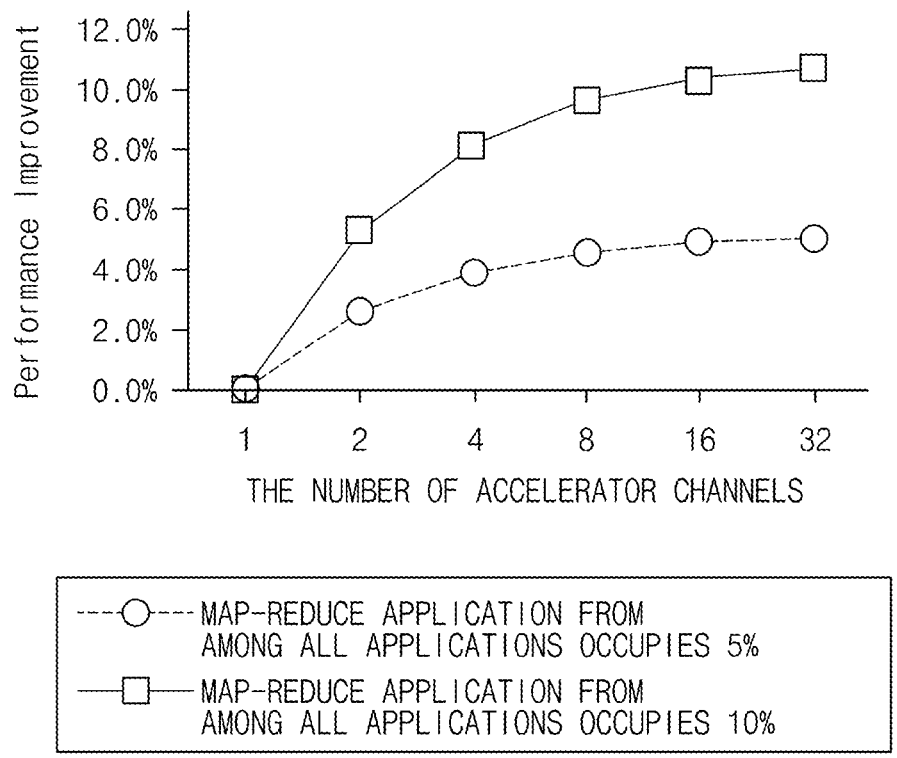
FIG. 26 is a view illustrating performance improvement of a memory system according to an embodiment of the present disclosure.

FIG. 26 illustrates performance improvements that may be obtained by using a memory system according to an embodiment of the present disclosure. In more detail, the graph of FIG. 26 shows that as the number of accelerator channels (CN) of the accelerator 512 used for map computation by the accelerator 512 increases, system performance is improved in proportion to the increase in the number of accelerator channels (CN).

As the number of accelerator channels (CN) of the accelerator 512 increases, system performance also increases in proportion to the increasing accelerator channels (CN), as shown in FIG. 26. However, the incremental improvement of system performance is gradually reduced as the number of accelerator channels (CN) is increased, whereas product costs needed to increase the number of accelerator channels (CN) continues to increase at substantially the same rate. Accordingly, embodiments may have a number of accelerator channels (CN) set to 2, 3, or 4 to optimize a cost-performance ratio. These numbers of accelerator channels are provided merely for illustrative convenience and are not intended to limit the embodiments thereto. For example, in other embodiments, the number of accelerator channels may be 5, 6, 7, 8, 9, 10, or more.

For purpose of illustration, it is assumed that energy of 1 pJ/bit (where "pJ" is a picojoule, a unit indicating energy) is consumed for each link L1 to transfer data through the node CND of each processor P1~P3. In order to process data using each processor P1~P3, the data to be processed must pass through a total of three links (i.e., a bus of each memory 520, a channel 40 of the fabric network 30, and the node CND of each processor P1~P3), such that energy of 3 pJ/bit is consumed. However, when off-loading of map computation is performed using the accelerator 512, this data has only to pass through the bus of each memory 520, such that total energy to be consumed for such data transfer can be reduced to 1 pJ/bit corresponding to ⅓ of the energy of 3 pJ/bit. In order to determine how much system energy can be saved, the static power consumption of all hardware (H/W) circuits may also be considered.

As described above, the pooled memory 500 according to the embodiments of the present disclosure include a plurality of memories 520 and may provide a large storage capacity and a large bandwidth, and may be used to provide an in-memory database or the like. In an embodiment, the accelerator 512 is included in the pooled memory controller (PMC) 510 and off-loading of map computation of the Map-Reduce application is carried out using the accelerator 512, such that system performance can be increased and energy consumption can be reduced. In another embodiment, accelerators 512 may be added to each of the plurality of memories 520.

As is apparent from the above description, the memory system according to the embodiments of the present disclosure may increase system throughput or performance, and may reduce energy consumption needed for data computation.

Those skilled in the art will appreciate that the embodiments may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, those skilled in the art will understand that claims that are not explicitly cited in each other in the appended claims may be presented in combination as an embodiment or included as a new claim by a subsequent amendment after the application is filed.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A memory system comprising:
    a memory controller configured to generate a memory control signal for controlling a read operation or a write operation of data; and
    a plurality of memory devices configured to perform the read operation or the write operation in response to the memory control signal,
    wherein the plurality of memory devices includes a first memory device and a second memory device,
    wherein the first memory device stores a first segment of data received from the memory controller, and
    wherein the second memory device receives the first segment of data, and stores a second segment of data which is partial segment of the first segment of data,
    wherein each of the plurality of memory devices includes:
        a controller configured to generate a control signal for determining a control mode of data in response to the memory control signal;
        an interface configured to interface with the memory controller in response to the control signal; and
        a memory core configured to store data received through the interface or to output stored data to the interface.

2. The memory system according to claim 1, wherein the plurality of memory devices is configured to perform direct data transmission among the memory devices.

3. The memory system according to claim 1, wherein the first memory device and the second memory device are configured to operate independently from each other.

4. The memory system according to claim 1, wherein the plurality of memory devices is coupled to the memory controller through a first data bus and a second data bus.

5. The memory system according to claim 4, wherein the plurality of memory devices is configured to share the second segment of data through the second data bus.

6. The memory system according to claim 1, wherein the first memory device and the second memory device are configured to operate successively.

7. The memory system according to claim 1, wherein the first segment of data is identical to the second segment of data.

8. The memory system according to claim 1, wherein:
when the control signal is set to a normal mode, the interface transmits the first segment of data to the memory core; and
when the control signal is set to a compression mode, the interface transmits the second segment of data to the memory core.

9. The memory system according to claim 1, wherein the memory core includes:
a data input/output (I/O) circuit configured to perform interfacing of the data with the interface;
a data driver configured to drive the data; and
one or more banks configured to store the data during the write operation, and output the stored data during the read operation.

10. The memory system according to claim 9, wherein the memory core further includes:
a common input/output (I/O) bus configured to transmit the second segment of data received through the data input/output (I/O) circuit.

11. The memory system according to claim 10, wherein the memory core further includes:
an internal input/output (I/O) bus configured to copy the second segment of data received through the common input/output (I/O) bus, and transmit the second segment of data to the data driver.

12. The memory system according to claim 9, wherein the memory core copies the second segment of data received through the data input/output (I/O) circuit and stores the second segment of data in a plurality of banks.

13. The memory system according to claim 9, wherein the memory core further includes:
a data compression circuit configured to compress the data received from the data driver during the read operation, and transmit the compressed data to the data input/output (I/O) circuit.

14. The memory system according to claim 13, wherein the data compression circuit compresses data received from a plurality of banks, and transmits the compressed data to the data input/output (I/O) circuit.

15. A memory system comprising:
a first memory device configured to perform a read operation or a write operation of data in response to a memory control signal, and store a first segment of data received through a first data bus and a second data bus; and
a second memory device configured to receive, through the second data bus, the first segment of data and store a second segment of data which is a partial segment of the first segment of data,
wherein each of the first memory device and the second memory device includes:
a controller configured to generate a control signal for determining a control mode of data in response to the memory control signal;
an interface configured to interface with a memory controller in response to the control signal; and
a memory core configured to store data received through the interface or to output stored data to the interface.

16. The memory system according to claim 15, wherein, in the second memory,
when the control signal is set to a normal mode, the interface transmits data corresponding to the first segment of data to the memory core; and
when the control signal is set to a compression mode, the interface transmits the second segment of data to the memory core.

17. The memory system according to claim 16, wherein the memory core includes:
a data input/output (I/O) circuit configured to perform interfacing of data with the interface;
a data driver configured to drive data from one or more banks or data from the data I/O circuit;
a data compression circuit configured to compress the data received through the data driver during the read operation, and transmit the compressed data to the data input/output (I/O) circuit; and
the one or more banks configured to store the data received from the data drive during the write operation, and output stored data to the data driver during the read operation.

18. The memory system according to claim 17, wherein the memory core further includes:
a common input/output (I/O) bus configured to transmit the second segment of data received through the data input/output (I/O) circuit; and
an internal input/output (I/O) bus configured to copy the second segment of data received through the common input/output (I/O) bus, and transmit the second segment of data to the data driver.

* * * * *